(12) United States Patent
Oh et al.

(10) Patent No.: US 9,460,208 B2
(45) Date of Patent: Oct. 4, 2016

(54) PUBLICATION AND INTERACTIVE DISCUSSION ENGINE DRIVEN BY USER-SPECIFIED TOPIC

(71) Applicant: Hubub, Inc., Toronto (CA)

(72) Inventors: Richard Oh, Toronto (CA); Peter Corsell, Miami Beach, FL (US); Robert Oh, Scarborough (CA)

(73) Assignee: Hubub, Inc., Toronto (CA)

( * ) Notice: Subject to any disclaimer, the term of this patent is extended or adjusted under 35 U.S.C. 154(b) by 321 days.

(21) Appl. No.: 13/837,470

(22) Filed: Mar. 15, 2013

(65) Prior Publication Data

US 2014/0108372 A1    Apr. 17, 2014

Related U.S. Application Data

(60) Provisional application No. 61/709,747, filed on Oct. 4, 2012.

(51) Int. Cl.
*G06F 17/30* (2006.01)
*G06F 17/00* (2006.01)

(52) U.S. Cl.
CPC ..... *G06F 17/30864* (2013.01); *G06F 17/3089* (2013.01)

(58) Field of Classification Search
CPC .............. G06F 17/30598; G06F 17/30864; G06F 17/3089; G06F 17/30675; G06F 17/2785; G06F 17/30253; G06F 17/30731; G06F 17/30017; G06F 17/30699; G06F 17/3071; G06F 17/30873; G06Q 30/02; G06Q 10/10; G06Q 10/00; G06Q 30/00; G06Q 50/01; G06Q 10/107
USPC .................. 707/705, 899; 715/753, 763, 838
See application file for complete search history.

(56) References Cited

U.S. PATENT DOCUMENTS

| | | | |
|---|---|---|---|
| 2009/0064003 A1* | 3/2009 | Harris et al. .................. | 715/763 |
| 2010/0205541 A1 | 8/2010 | Rapaport et al. | |
| 2012/0072405 A1 | 3/2012 | Guay et al. | |

OTHER PUBLICATIONS

ISA/US, International Search Report, Int'l Application No. PCT/US13/63536, Apr. 28, 2014, p. 3.

* cited by examiner

*Primary Examiner* — Yicun Wu
(74) *Attorney, Agent, or Firm* — Greenberg Traurig LLP

(57) ABSTRACT

A backend system is described for populating web-accessible pages with content along with a user interface for interactive discussion of an end-user-specified topic. In an embodiment the system receives a topic from an end user, conducts a search relating to the topic, displays thumbnails representing content items such as videos, articles, tweets and photos from a multitude of content sources across the internet regarding the topic, provides the user with an interface to select which of the items should appear on a published topic page, and builds one or more web-accessible pages having dynamic content that is relevant to the topic along with interactive means for provoking participation of multiple users regarding the topic and the content.

12 Claims, 24 Drawing Sheets

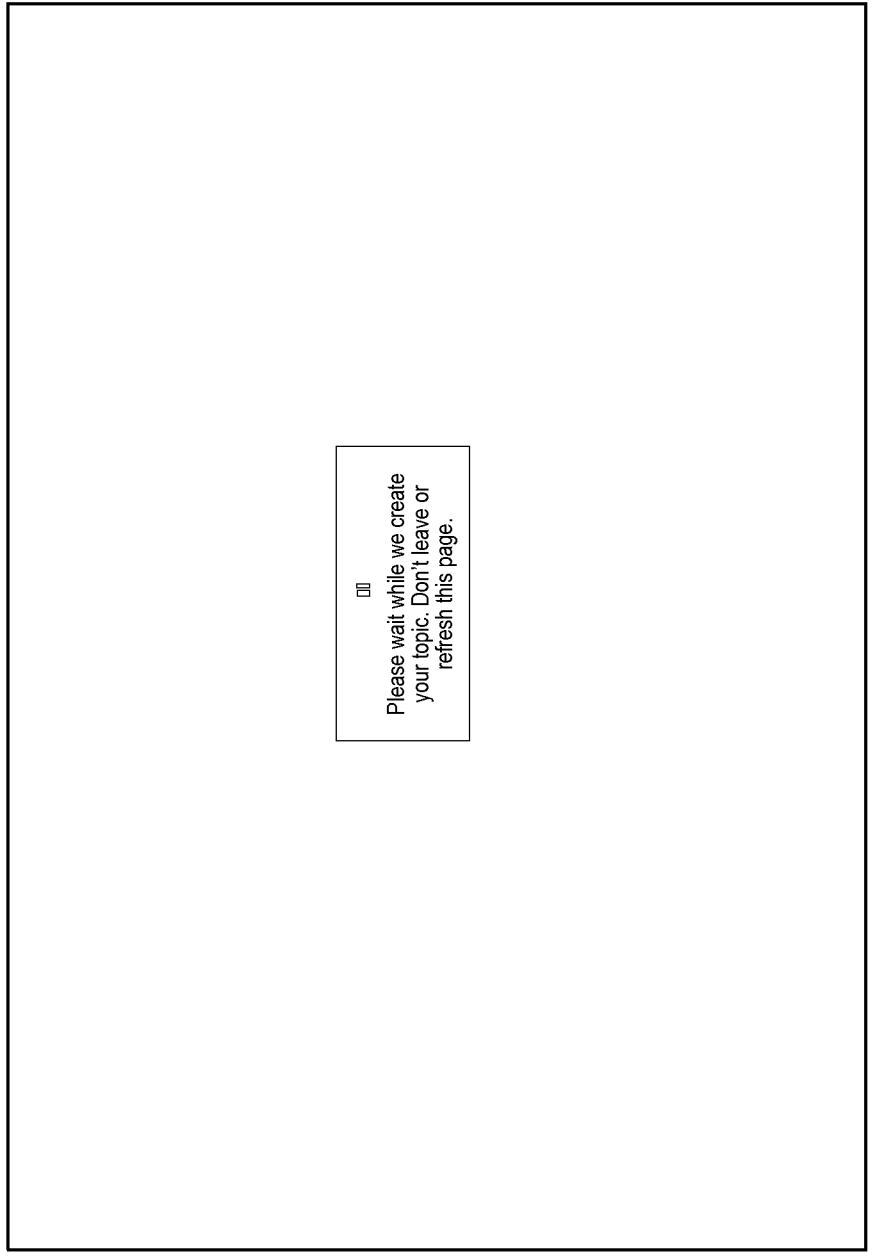

PUBLICATION AND INTERACTIVE DISCUSSION ENGINE DRIVEN BY USER-SPECIFIED TOPIC

This application claims priority to U.S. Provisional Patent Application No. 61/709,747 filed Oct. 4, 2012, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of publishing and interactive content management, and in particular to a publication and interactive discussion engine that is driven by a user-specified topic.

SUMMARY

In an embodiment, the invention provides a backend system for populating web-accessible pages with content along with a user interface for interactive discussion of an end-user-specified topic. The system in this embodiment receives a topic from an end user, conducts a search relating to the topic, displays thumbnails representing content items such as videos, articles, tweets and photos from a multitude of content sources across the internet regarding the topic, provides the user with an interface to select which of the items should appear on a published topic page, and builds one or more web-accessible pages having dynamic content that is relevant to the topic along with interactive means for provoking participation of multiple users regarding the topic and the content.

BRIEF DESCRIPTION OF THE DRAWINGS

Further objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 1 shows a graphical user interface illustrating an initial screen prior to login in accordance with an embodiment of the invention.

FIG. 5B shows a graphical user interface illustrating a topic feature selection screen in accordance with an alternate embodiment of the invention.

FIG. 6 shows a graphical user interface illustrating a topic feature selection screen in accordance with an alternate embodiment of the invention.

FIG. 8 shows a graphical user interface illustrating a topic tag selection screen in accordance with an alternate embodiment of the invention.

FIG. 9 shows a graphical user interface illustrating a topic tag selection screen in accordance with an alternate embodiment of the invention.

FIG. 11 shows a graphical user interface illustrating a topic creation wait screen in accordance with an alternate embodiment of the invention.

FIG. 15 illustrates a home page in accordance with the social-search embodiment.

FIG. 16 shows an initial results page for an exemplary search in accordance with the social search embodiment.

FIGS. 19-21 show pages illustrating a debate feature in accordance with an embodiment of the invention.

DETAILED DESCRIPTION

Reference will now be made in detail to the preferred embodiments of the present invention, examples of which are illustrated in the accompanying drawings.

The present invention is described below with reference to diagrams and operational illustrations of methods and devices to populate web pages with content and a user interface in accordance with an end-user-specified topic. It is understood that each step illustrated in the diagrams or operational illustrations, and combinations of steps in the diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the diagrams and textual description thereof. In some alternate implementations, the functions/acts noted in the diagrams may occur out of the order noted in the operational illustrations. For example, two steps shown in succession may in fact be executed substantially concurrently or the steps may sometimes be executed in the reverse order, depending upon the functionality/acts involved.

Figure 1:
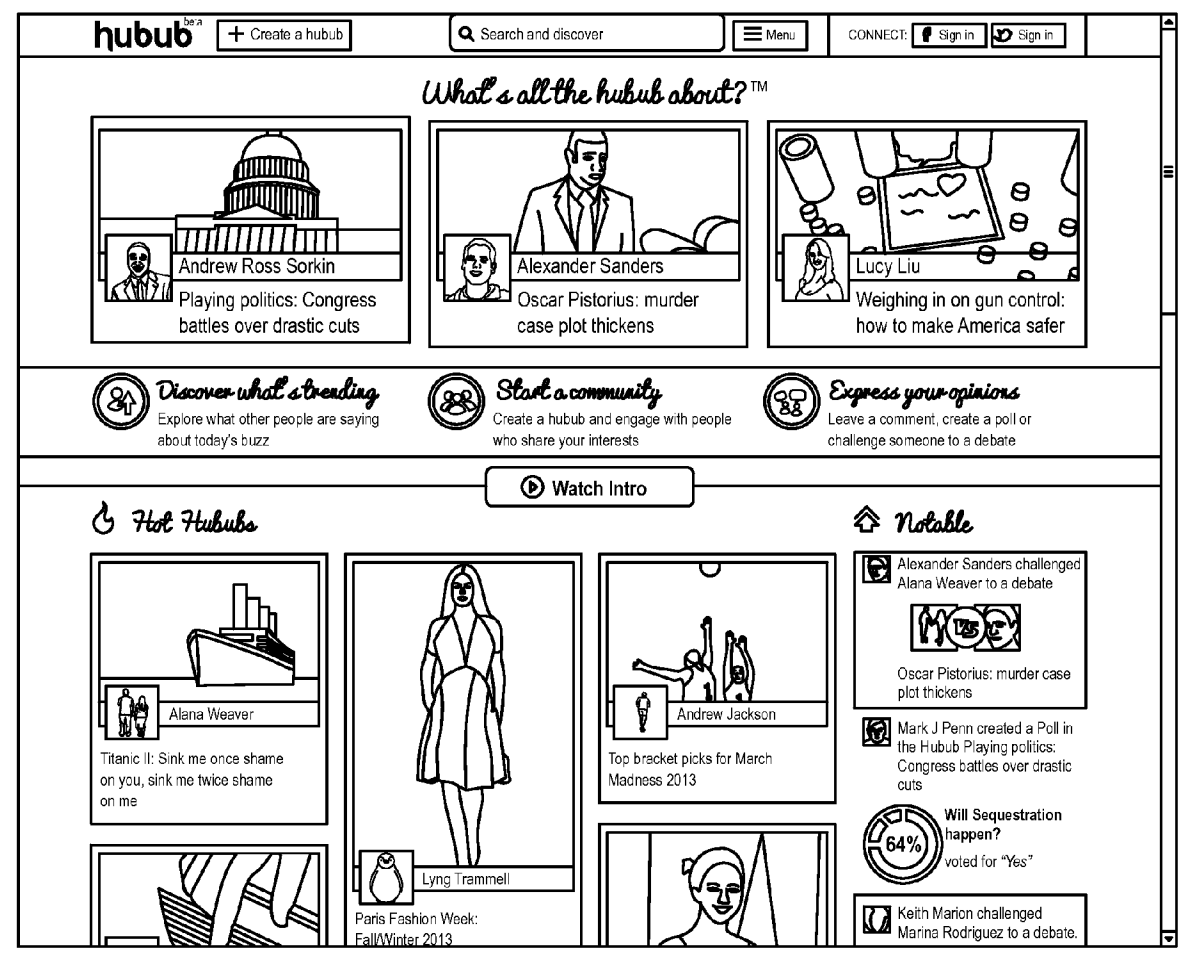

FIG. 1 shows a user interface for a login screen in accordance with an embodiment of the system. As with each of the user interface screens discussed below, the interface is served by a web server device and accessible to users over a network via a web browser on the user's client device, which may be an end user computer, tablet, smart phone, or other device capable of running a browser that receives and presents content and a user interface from a server. The content and user interface may be in the form of one or more HTML, XML, and/or other browser displayable files along with accompanying graphic and video content files.

As is illustrated in FIG. 1, users can sign in to the system via a social media provider of which they are a member. Examples of such social media providers include, e.g., FaceBook, Twitter, Google+, and the like. The function of providing sign in functionality through a social media provider may be performed in whole or in part by an app that is written for a particular provider, e.g., a FaceBook app, or may be performed in whole or in part by one or more web-connected servers. In alternative embodiments, sign in may be provided without interaction with a social media site.

Figure 2:
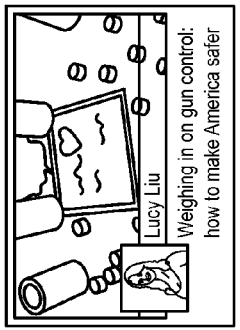
FIG. 2 shows a graphical user interface illustrating an initial screen after login in accordance with an embodiment of the invention.

FIG. 2 shows a graphical user interface illustrating an initial screen following login in accordance with an embodiment of the invention. The initial screen can include, e.g., trending discussions, news items, polls, debates/challenges, etc., along with the associated controls and other user interface elements. The user interface can be generic, particularly for newly registered users, or customized for the particular user that has logged in. Shown in the initial screen of FIG. 2 is a "Create a Hubub" pushbutton control which initiates a topic creation process illustrated in the following figures.

Figure 3:
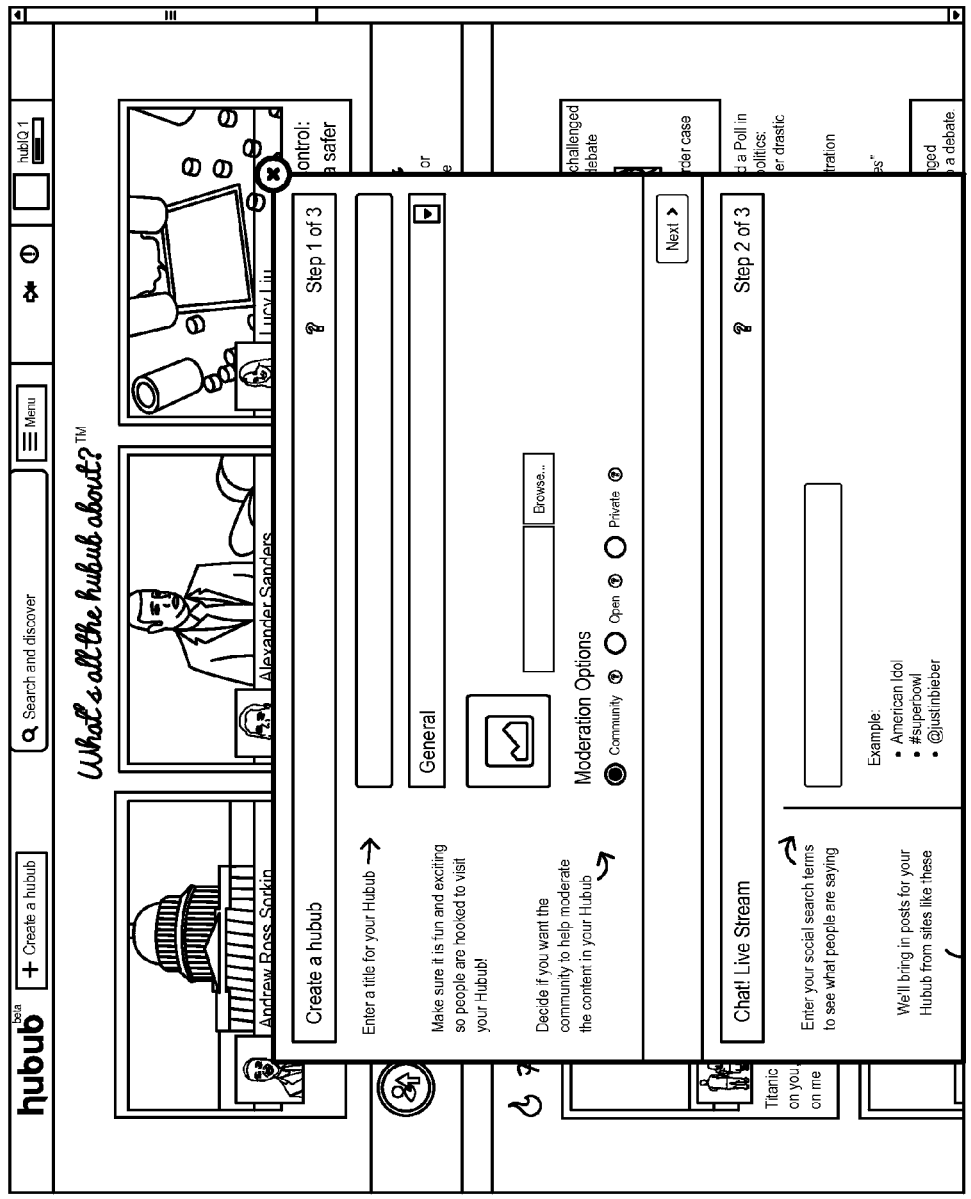
FIG. 3 shows a graphical user interface illustrating a topic creation screen in accordance with an embodiment of the invention.

FIG. 3 shows a graphical user interface illustrating a topic creation screen in accordance with an embodiment of the invention. This screen is triggered by the "Create a Hubub" pushbutton discussed above, and prompts a user to input a new topic for publication. Any topic of interest can be used as input to the system of the invention. In addition to the topic, the system may optionally prompt a user to select a category for the topic. Non-limiting examples of such categories include General, News, Legal and Crime, Politics and Government, Science and Environment, Sports, NHL, NFL, MLB, Olympics, NBA, Finance, Business and Economy, Personal Finance, Entertainment, TV, Movies, Music, Gaming, Celebrity, Living, Beauty and Fashion, Dating and Relationships, Health and Fitness, Parenting, Food, Tech, Smartphone, Tablet, Internet, Autos, Buying and Selling, Repairs and Maintenance, Travel, Destination, and Vacation Planning The available categories may be static or may be dynamically selected by the system in accordance with trending topics.

With continued reference to FIG. 3, when the new topic is created, the user is given three choices as to how posts on the pages he or she is creating will be moderated and made available to the public. Non-limiting examples of these choices are: Community, Open, and Private. When the "Community" option is checked, community members may assist in approving posts before each post is publicly displayed. In this respect, a community is a social network of users who are registered in the system. A community can be topic-based, i.e., it can include only those who have subscribed to a particular topic, or it can be a wider community that includes, for example, all users who have registered with the system. When the "Open" option is checked, all posts are immediately viewable by the public. When the "Private" option is checked, all posts are sent to the creator of the topic for approval before the post is posted on the topic page. The Private option may further be configured to keep posts completely private such that members of the public cannot search for posts, and the posts are available to the poster and members of his social network or sub-network only. For example, such completely private option may be used to create a topic that is viewable only to members of a "class project" social network. As is further shown in FIG. 3, the topic creation screen may include a control that allows a user to upload an image associated with the topic chosen. Such control is shown as a "Browse' button on FIG. 3.

Figure 4:
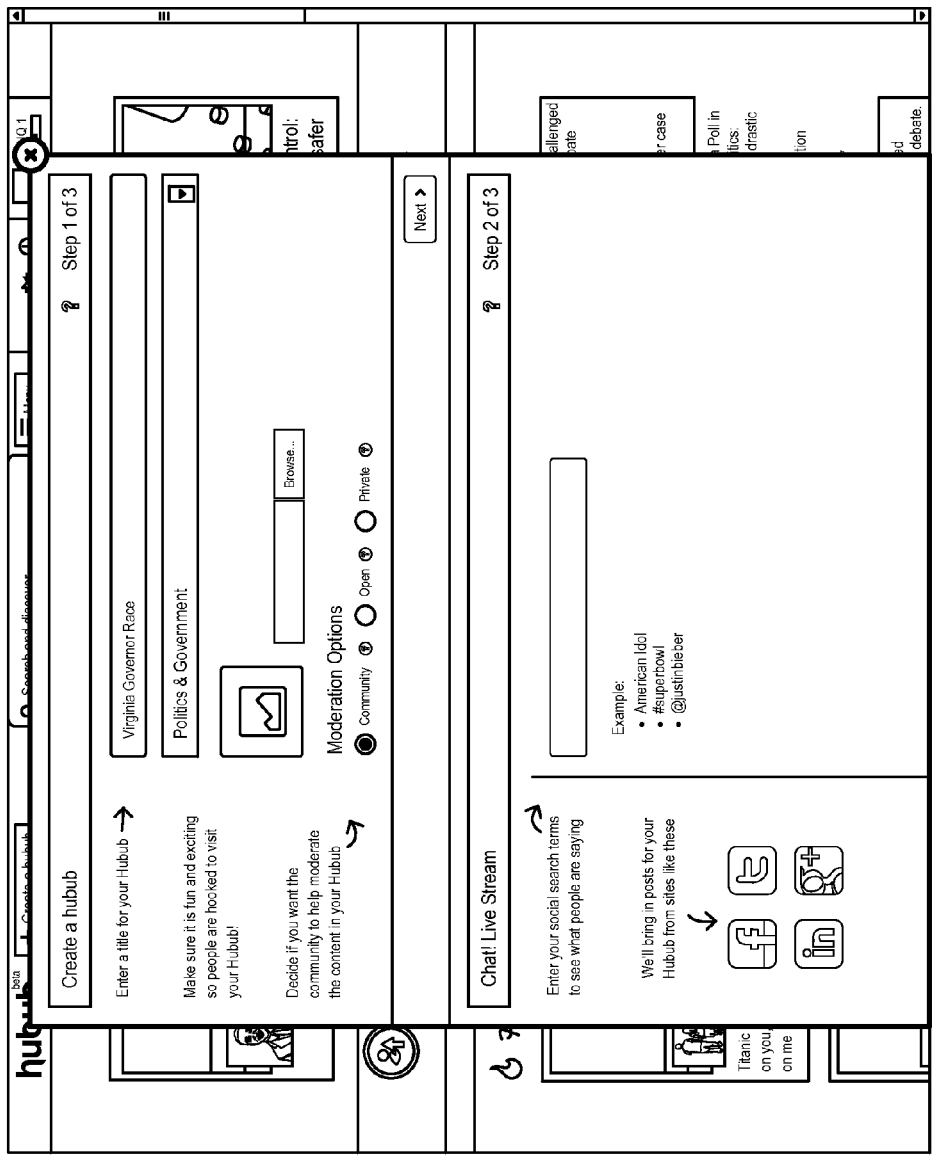
FIG. 4 shows a graphical user interface illustrating a topic creation screen in accordance with an embodiment of the invention.

FIG. 4 shows the graphical user interface of FIG. 3 with a topic having been entered by the user and a category for the topic having been selected. Activating the "Next Step" pushbutton control in FIG. 4 causes the system to conduct a backend search of web sites, RSS feeds, twitter feeds, social networking feeds, and other internet-accessible sources for content that is pertinent to the selected topic. Such content includes, e.g., videos, articles, tweets, and photos. The search engine may maintain and use its own database for the search, and/or may interface with third party search engines. The search logic may be configured to use the category chosen in the topic creation screen of FIG. 3 to improve the relevance of the search results.

Figure 5A:
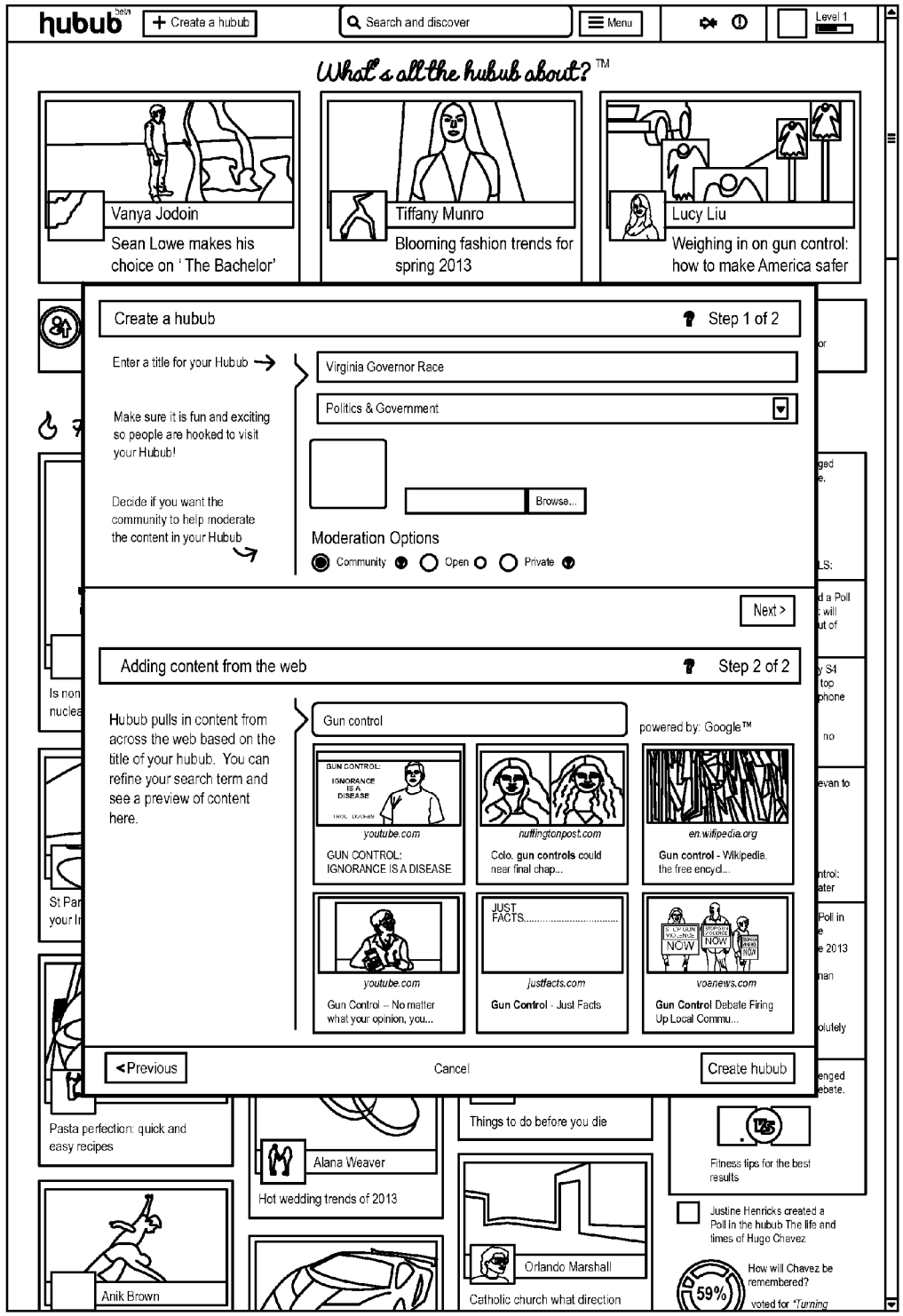
FIG. 5A shows a graphical user interface illustrating a topic feature selection screen in accordance with an embodiment of the invention.
Figure 7:
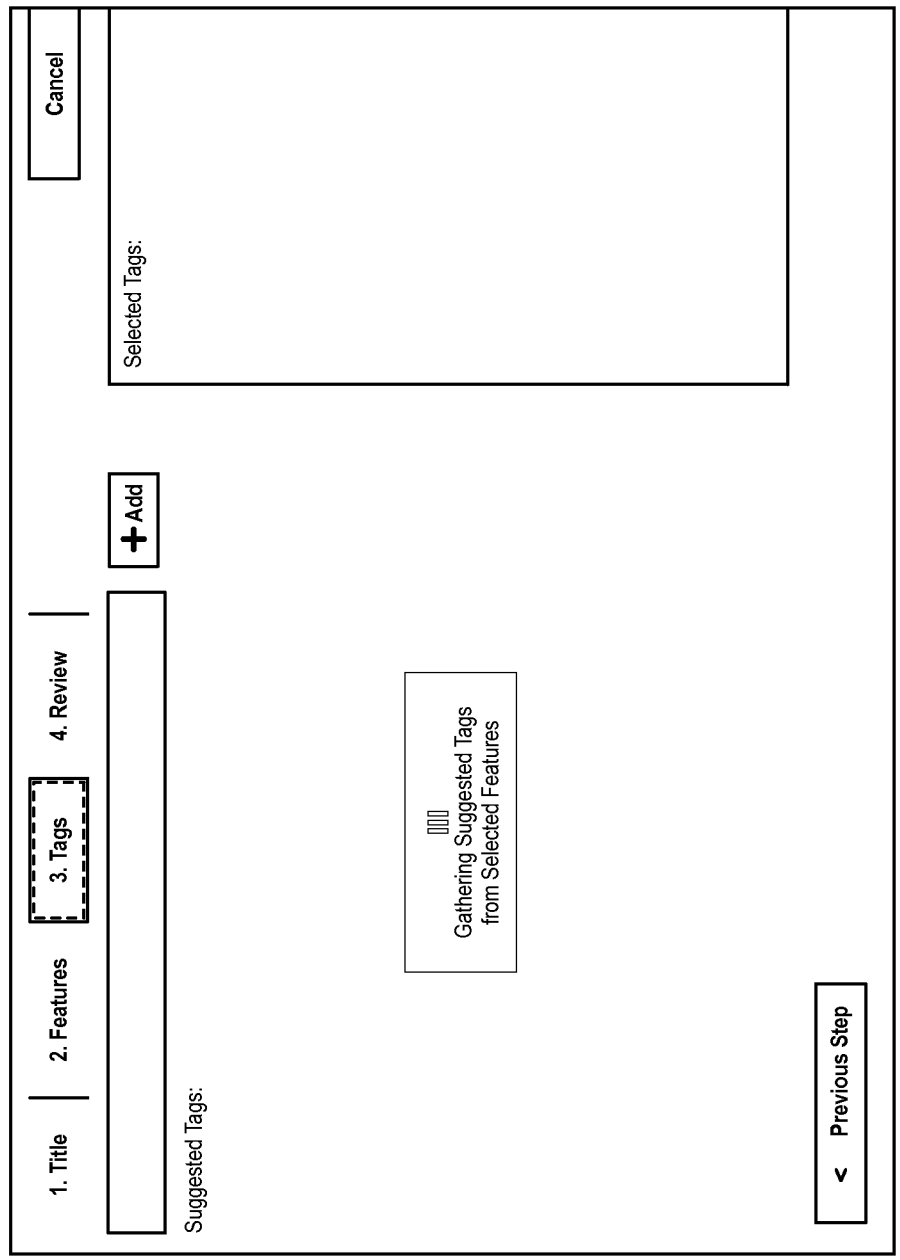
FIG. 7 shows a graphical user interface illustrating a topic tag gathering screen in accordance with an alternate embodiment of the invention.

FIG. 5A shows a refinement page that is the result of clicking on the "next" button in FIG. 4. This page allows a user to enter search terms that, in addition to the topic title and topic category, will be used by the system to search for content with which to populate the topic page being created. In this screen, the user can enter such additional search terms and see a preview of content relating to the topic title, category, and additional search terms. Such content is a preview of the initial content that will be provided on the user's published topic page. While the user types in search terms, the system according to the invention searches for content either within the system or elsewhere on the internet, or both, and returns the preview content in real time. If the user changes the search terms in this screen, the content preview also changes in real time. In this respect, the user can change the search terms that are being used until he or she is satisfied that the right content will result, and then click on the "Create hubub" button to create a published topic page. Doing so brings the user to the screen shown in FIGS. 12A and 12B.

Figure 5B:
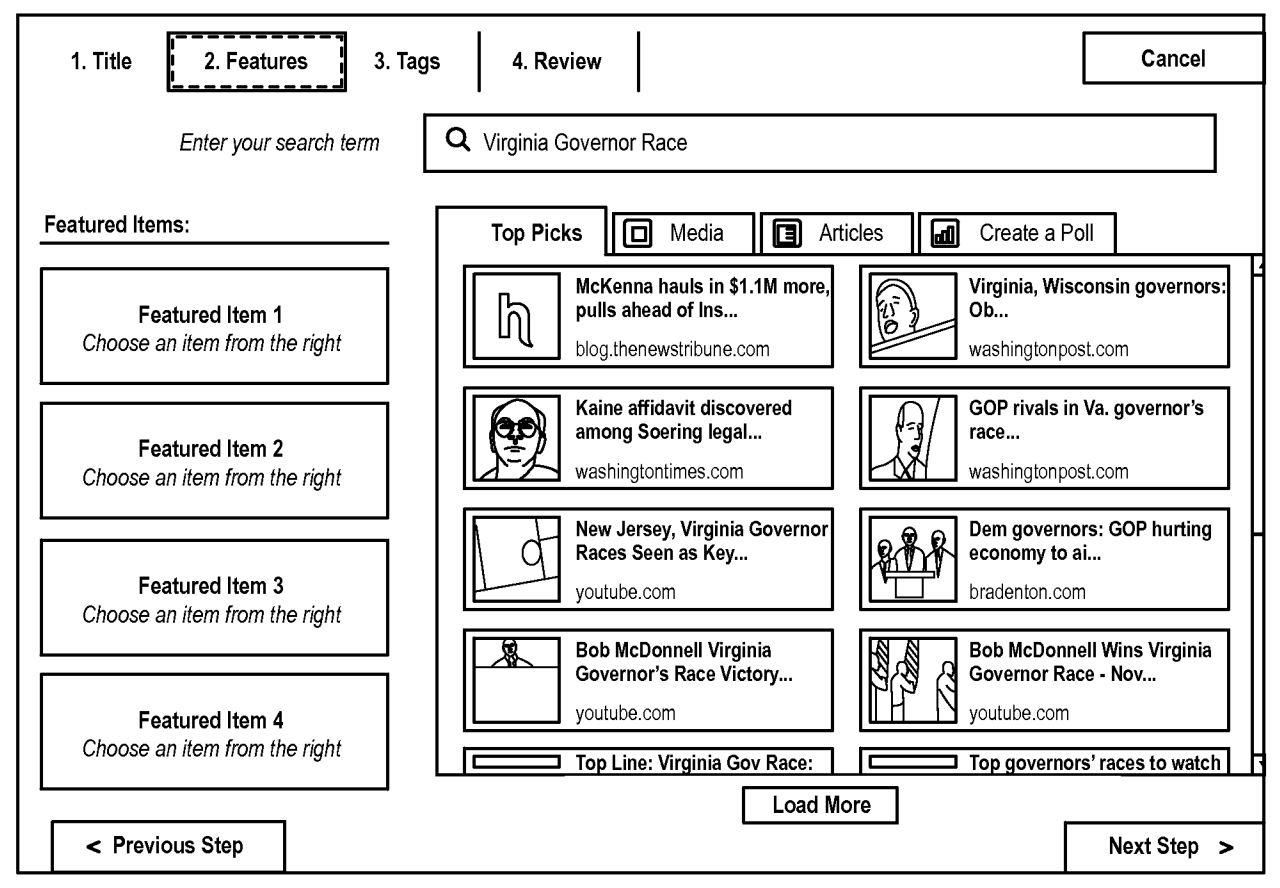
Figure 12A:
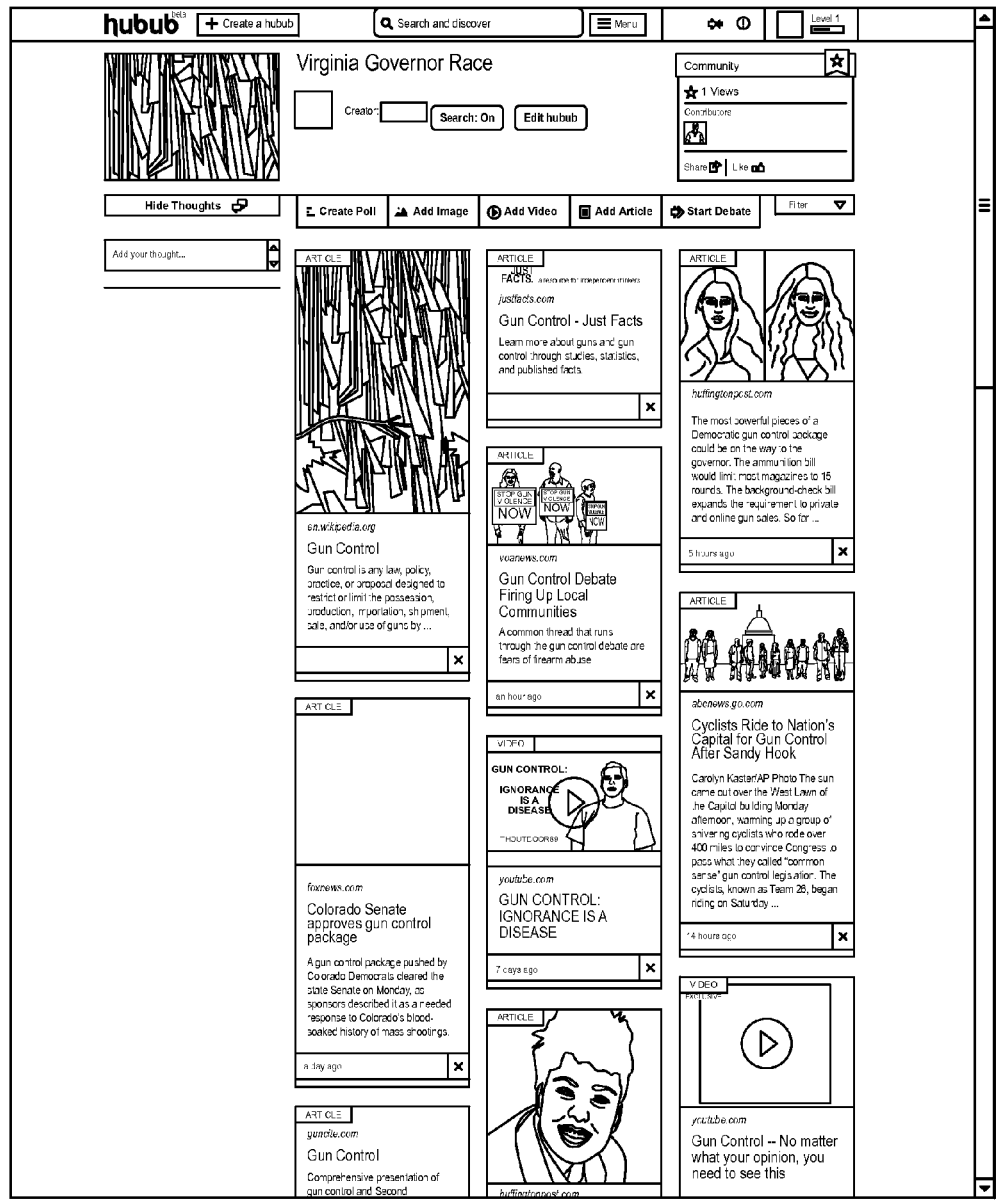
FIGS. 12a and 12B show the top and bottom, respectively, of a published topic page in accordance with an embodiment of the invention.
Figure 12B:
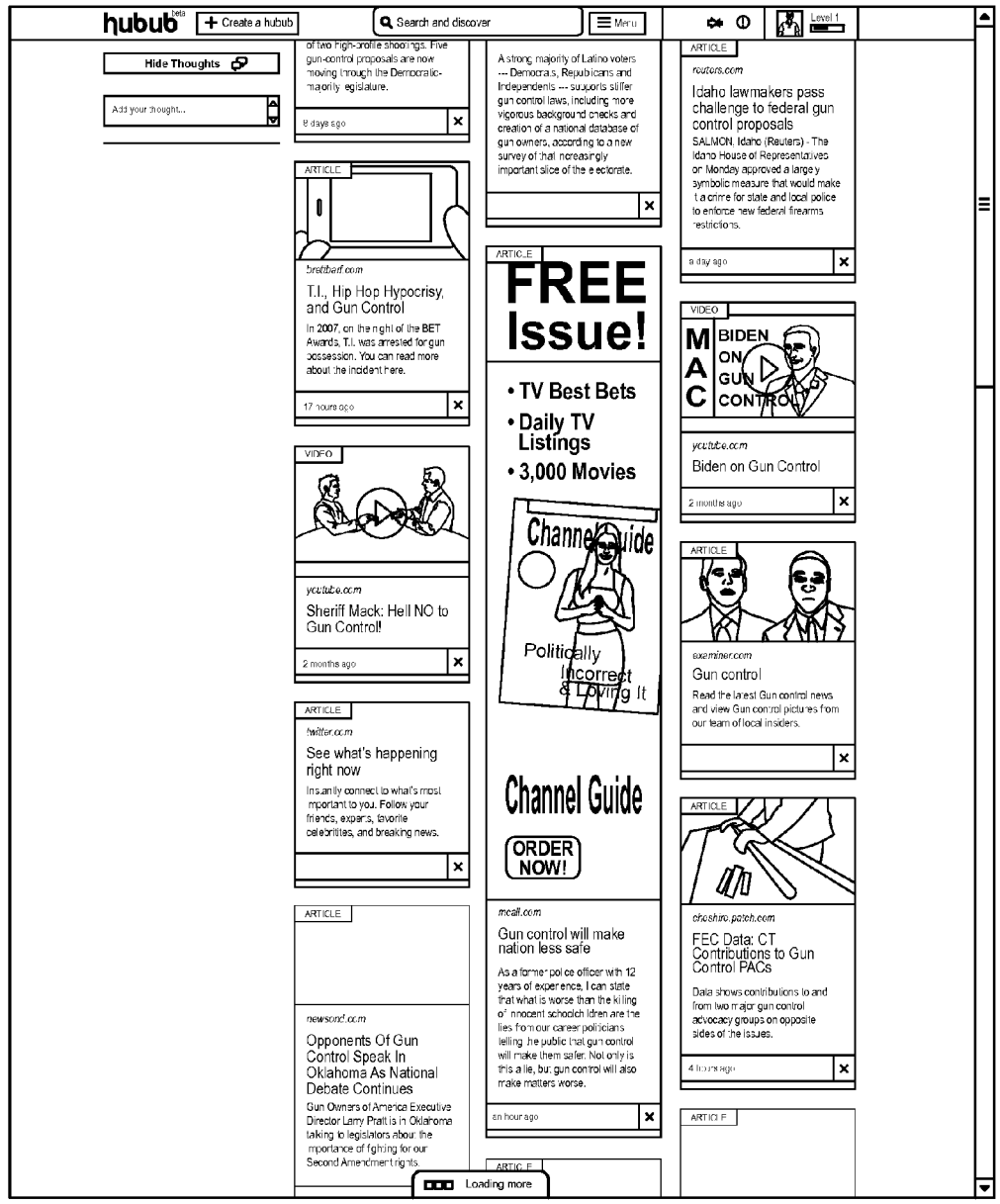

FIGS. 5B though 11 illustrate an alternative method for getting from the topic creation screen of FIG. 4 to the published topic page of FIGS. 12A and 12B. That is, FIGS. 5B through 11 are an alternative to the refinement screen of FIG. 5A. In these figures, a manual process requiring substantial user interaction is used to set up a search that will be used by the system to populate a published topic page, whereas such process is largely performed automatically by the system in the embodiment of FIG. 5A. FIG. 5B shows a graphical user interface illustrating a topic feature selection screen, which is the next step in the topic creation process once the initial search has been conducted. Thumbnail images and headline type descriptions representing items resulting from the search are shown on the right hand side of the screen. The user can select from these search results the items that the user desires to be featured on their published topic page. The selection may be performed by means of a "select" button that appears when the user hovers over an item in the search results on the right, or may be performed by other known selection means such as a drag-and-drop interface, radio buttons, check boxes, or the like. Tabs may be provided for user selection of the manner in which the system displays search results in the present screen. For example, selection of the "Top Picks" tab displays only those search results that have been elevated to a certain predetermined level of popularity. Likewise, selection of the "Media" tab limits the search results displayed to those that are media, and selection of the "Articles" tab limits the search results displayed to those that are articles. A "Create a Poll" tab may be provided to allow the user to create a poll to be included in their published topic page. The poll creation process is discussed further below.

Figure 6:
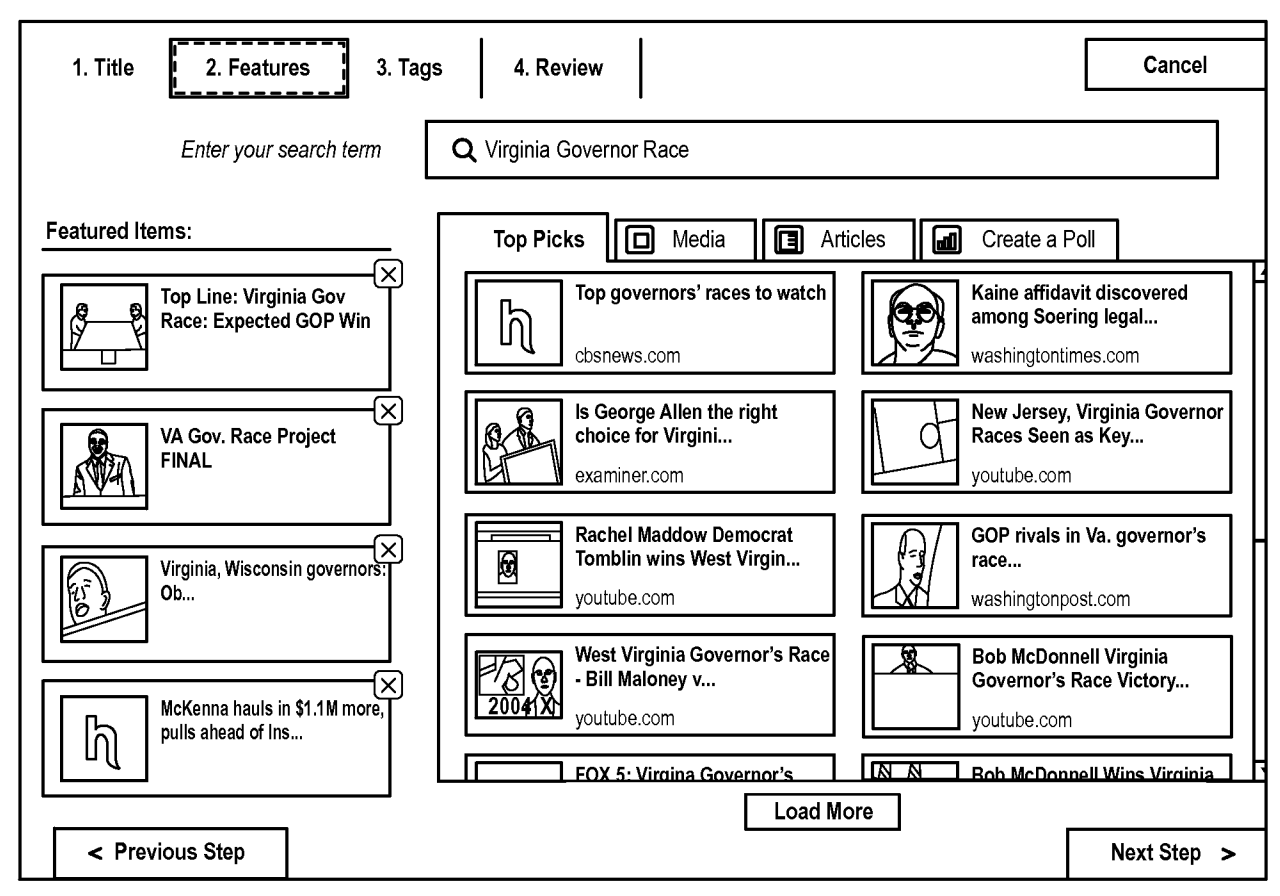

FIG. 6 shows the user interface of FIG. 5B with four featured items having been selected and showing in the left hand column.

Once the user has selected the items to be featured in their published topic page via the user interface shown in FIGS. 5 and 6 and selects the "Next Step" pushbutton control, the system gathers hash tags associated with the selected feature items. See FIG. 7. The system then displays hash tags to the user as is shown in FIG. 8.

Figure 8:
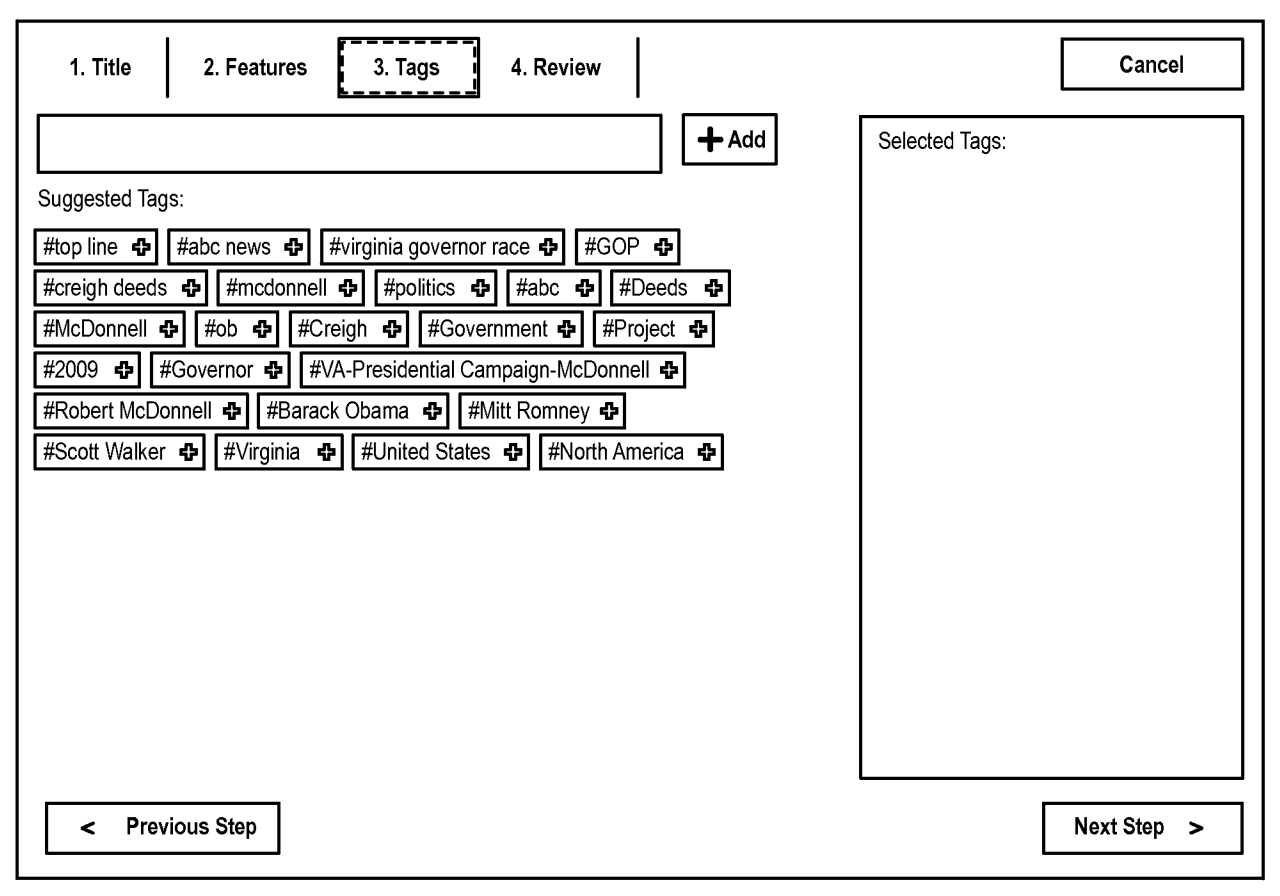
Figure 9:
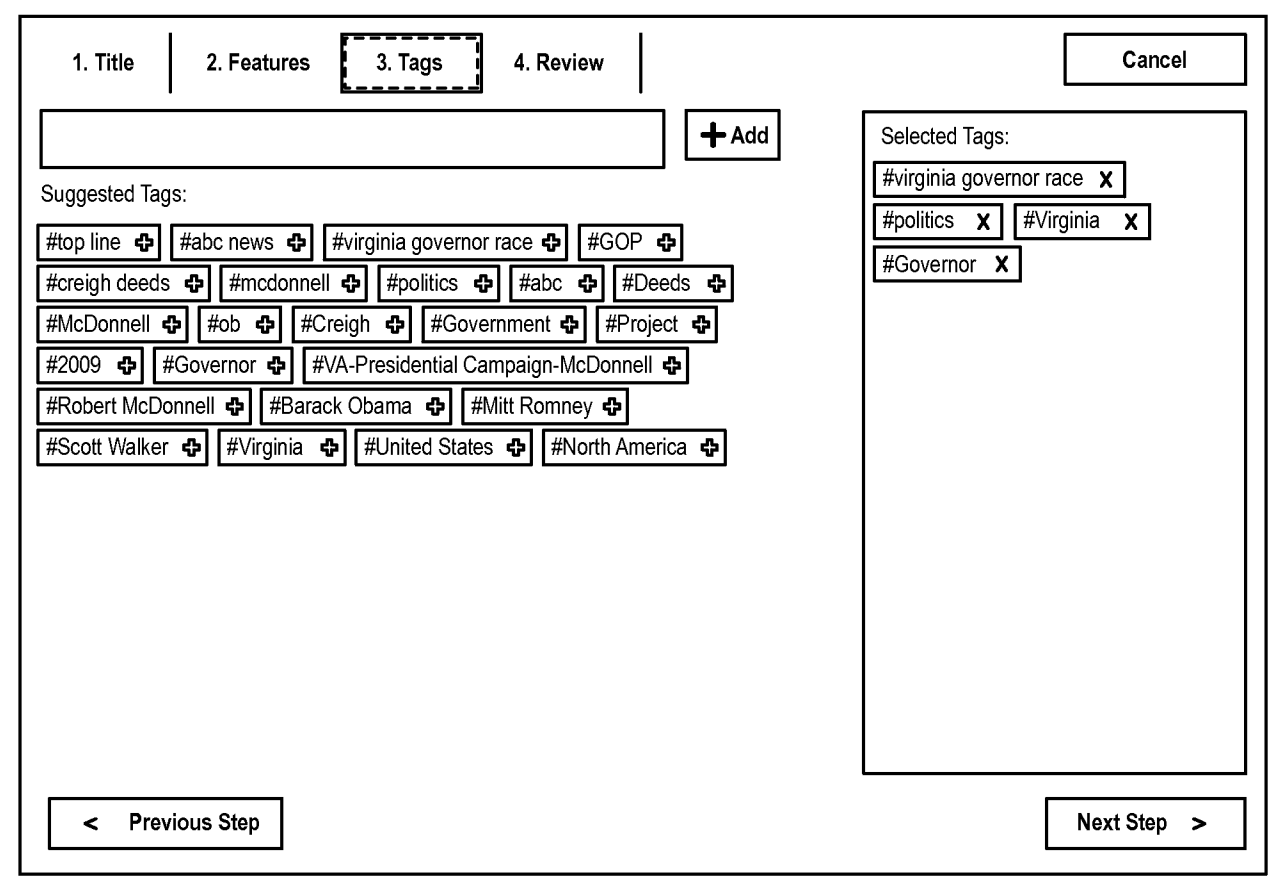

The user interface shown in FIG. 8 allows the user to select from the hash tags associated with their featured items those hash tags that are to be associated with their published topic page. The user may choose those hash tags that are the best fit for his particular topic and/or those hash tags that are more likely to drive desired traffic to his published topic page. When the topic page is published, the selected hash tags can be published as metadata associated with the page, fed to search engines, fed to social networking sites, fed to news sites, or otherwise distributed with a reference to the published topic page, such as a URL at which the page can be found. FIG. 9 shows the user interface as in FIG. 8 with pertinent hash tags having been selected by the user in the right hand column of the screen. A "Next Step" pushbutton control is provided for advancing to a topic review screen once the user has finalized their selection of hash tags.

Figure 10:
FIG. 10 shows a graphical user interface illustrating a topic review screen in accordance with an alternate embodiment of the invention.

FIG. 10 shows a graphical user interface illustrating a topic review screen in accordance with an embodiment of the invention. The screen displays a summary of the title, featured items, hash tags to be utilized in building and populating the user's published topic page. Once the user has reviewed and approves of the summary information, he may select the "Submit" button to cause the system to create the page. FIG. 11 shows a "Wait" screen that may appear once the "Submit" button has been activated.

FIGS. 12A and 12B show the top and bottom, respectively, of a topic page that has been published and made accessible to the user that created the page, all users in a community such as a social network, and/or all users on the internet. The content on the published topic page relates to the topic and category entered by the user in FIG. 4, refined by the search terms entered and edited in real time on FIG. 5. The page may include both static and interactive content, including videos, articles, tweets, photos, poll results, a poll creation interface, a status line where a user can add his thought to the page, an "Add Image" tab that allows a user to add a photo or other graphical content to the published topic page, an "Add Video" tab that allows a user to add a video to the published topic page, and an "Add Article" tab that allows a user to add an article to the published topic page. The published topic page may include the image uploaded by the user via the topic creation user interface shown in FIG. 3. Once a topic page has been published, the user can then add his opinion, ask the community to vote on questions, perform administrative tasks associated with managing the topic, or perform any function provided to other users visiting the page.

The published topic page is dynamic and changes over time as users interact and as new items associated with the topic, category, and selected search terms (or the selected hash tags in the alternative embodiment) become available from other sources on the internet. In this respect, the system of the invention can be configured to continuously or regularly conduct a search of internet-accessible sites using the topic, category, and search terms (or the selected hash tags in the alternative embodiment) associated with items appearing on the page initially and over time, and add new items to the page that is published as they are discovered in such ongoing search. For example, twitter feeds can be monitored by the system and tweets matching the topic/category/search terms (or selected hash tags) can be re-posted to the published topic page. As shown at the top of FIG. 12A, a toggling "Search On"/"Search Off" pushbutton control can be provided to allow the user to select whether the dynamic updating feature is turned on or not.

As illustrated in FIG. 12A, a "Create A Topic" pushbutton control may be provided on the published topic page. Activation of this pushbutton control allows any user viewing the page to create a new topic or subtopic related to the current topic page using the same or a similar process as is described above with reference to FIGS. 3-12.

Figure 13:
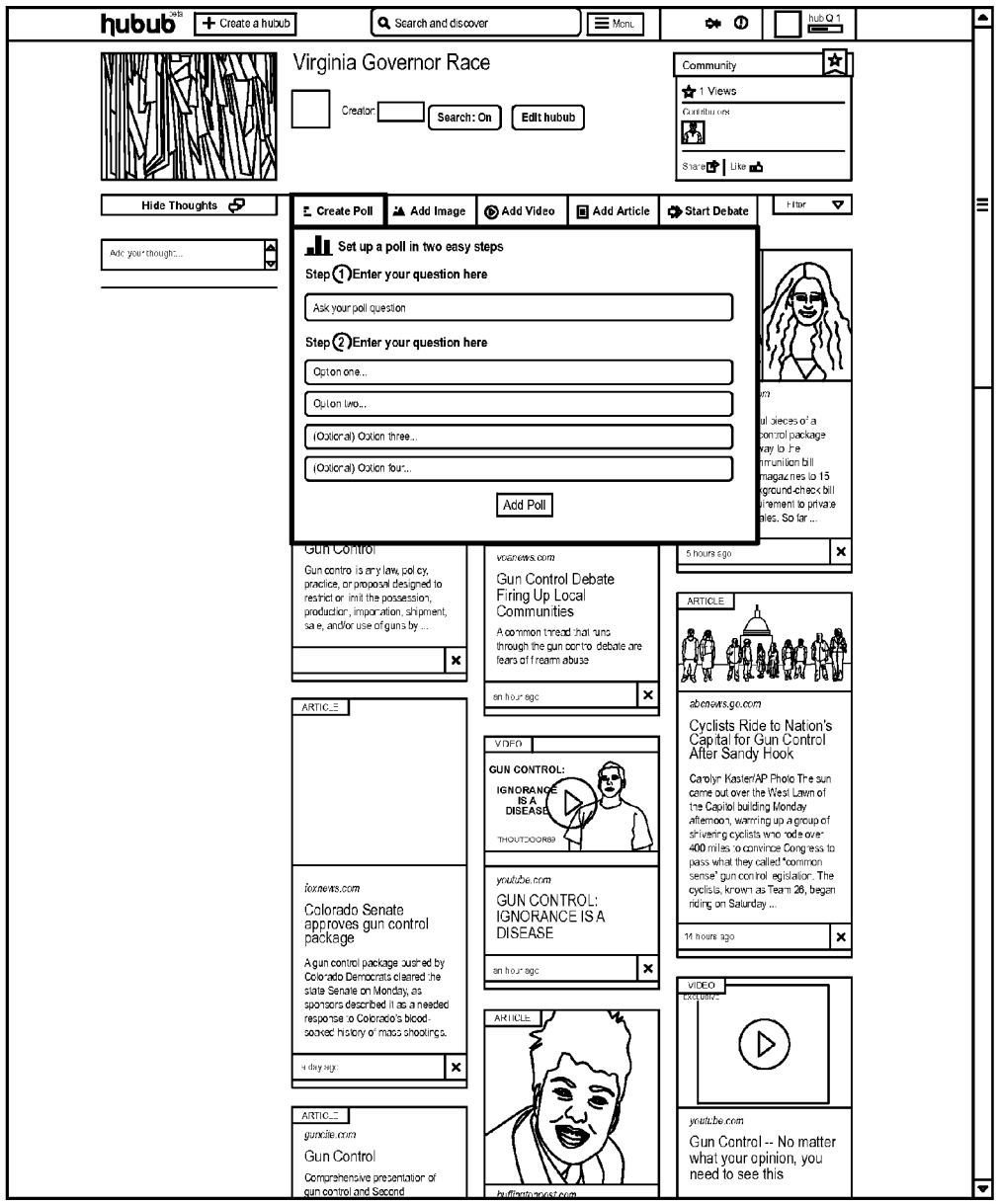
FIG. 13 shows a graphical user interface illustrating a poll creation portion of a published topic page in accordance with an embodiment of the invention.
Figure 14:
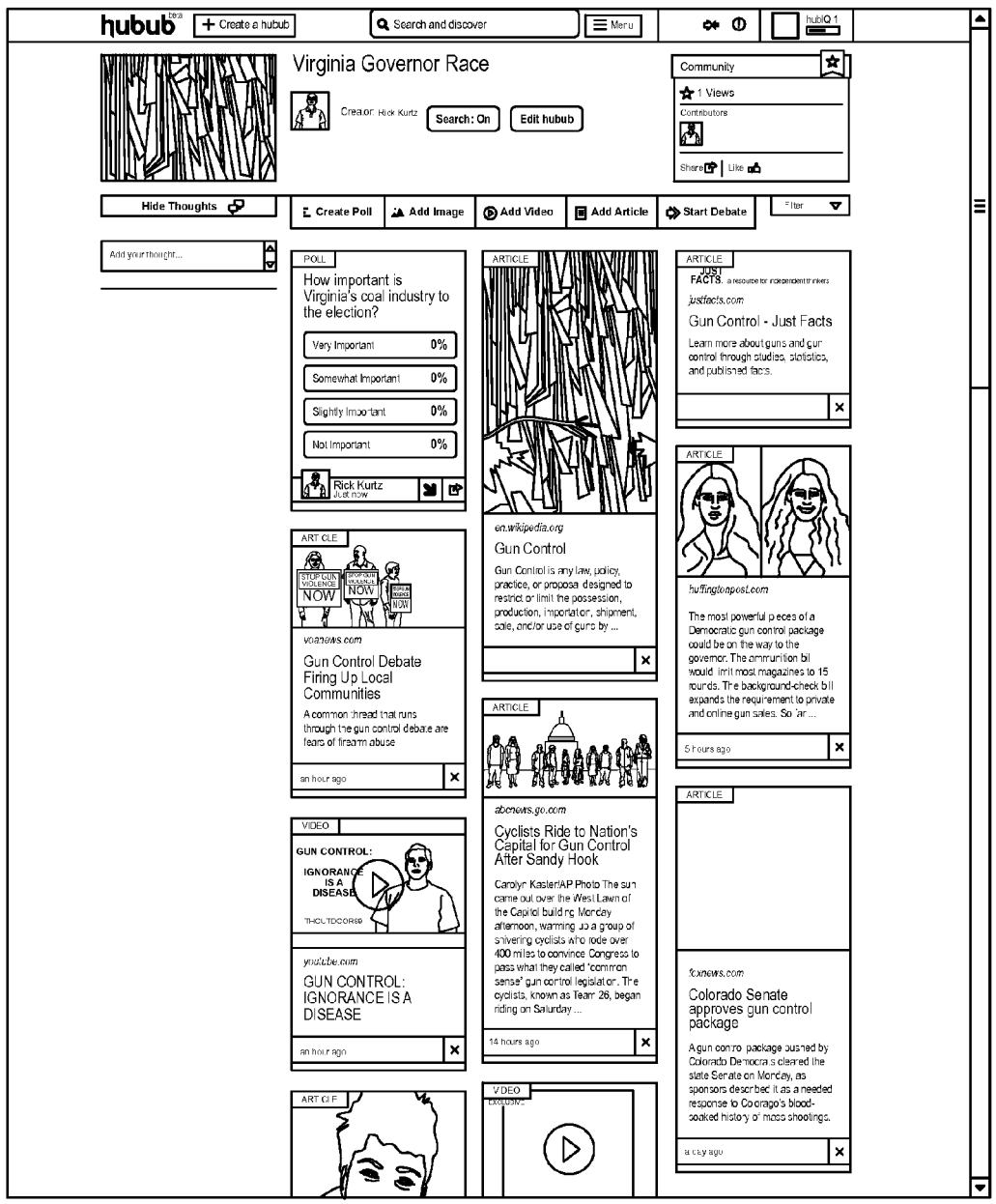
FIG. 14 shows a graphical user interface illustrating a poll portion of a published topic page in accordance with an embodiment of the invention.

FIG. 13 shows a graphical user interface illustrating a poll creation portion of a published topic page in accordance with an embodiment of the invention. Upon selecting a "Create Poll" tab on the published topic page, fields appear on the page that allow a user to enter a poll question, add an image to be associated with the poll, add options for answering the poll, and any other information that is useful for creating a poll. FIG. 13 shows the published topic page with the "Create Poll" tab selected and the fields thereunder having been filled in by a user. In this example, the user enters a poll question "How important is Virginia's coal industry to the election?" and has entered the options "Very important," "Somewhat important," "Slightly important" and "Not important." Once the fields are completed and the "Create" pushbutton control is selected by the user, the system creates and inserts the poll into the published topic page. FIG. 14 shows a graphical user interface illustrating a poll portion of a published topic page in accordance with an embodiment of the invention.

In syndication embodiments, the system of the invention is programmed and otherwise configured to provide brokering services between content providers desiring to expeditiously publish photos, videos and other copyrighted works and third party publishers or news agencies. For example, a user who has taken a photo or video depicting a breaking news event can use the system to publish such photo or video and specify or agree to terms of a license grant that the user is willing to accept for access to or re-publication of the work by third parties. The system can be configured to charge such third parties accordingly for access or republication rights in the work, or to grant a license to such third parties under terms specified by or agreed to by the user who has uploaded the work.

In a further embodiment, the system is programmed and otherwise configured to interact with a social networking site, such as FaceBook, Twitter or Google+. For example, the system may be configured to publish to a user's wall on a social networking site, utilize a user's list of friends, followers, or other associates in distributing content, and send notifications through such social networking sites. These functions may be performed in whole or in part by an app that is written for a particular provider, e.g., a FaceBook app, or may be performed in whole or in part by one or more web-connected servers.

A level tracking system, designated herein as "HubIQ", can be provided to track all activity on the website of the invention to give users a credibility score ("IQ score"). Since users want to be known as being intelligent, the IQ score creates the right motivating factor for users to play clean and intelligently. Site moderation can be conducted automatically with user support via voting in this regard. The invention can interrelate content and scores to community voting on the content. For example, if a user submits content and it becomes popular, the user is awarded points. However if the user submits content that results in review, the following happens:

i) the content remains on the website of the invention but a flag will present stating under review;
ii) a notice will go to participants on the topic and then to the community to vote on the content under review;
iii) the notice will show up in an invited judges message stream;
iv) if they chose to participate, they will read a warning that says the content maybe offensive and they will earn hubIQ points (our new game mechanic label);
v) if the majority of the judges agree this should be removed. it will be kicked. judges will be tracked on decisions that the majority agreed with or disagreed with in the hubIQ;
vi) the poster will get a notice that his material has been reviewed and removed and that will be tracked in the hubIQ;
vii) the poster will then have a chance to appeal by clicking the appeal button. If he does so, the process repeats but with new judges;
viii) if it survives review, then the post will have a verified label.

Voting on a particular post, poll, or other content can be limited to a particular community within the system or may be available to other larger communities (or, in one embodiment, even members of the public). With respect to step ii) above, the system can be configured such that if the number of persons voting on a particular post or other content is insufficient, i.e., below a certain threshold number of votes, the post or other content can be displayed to a wider community for voting. FIGS. 15-18 illustrate a social-search embodiment of the invention. In this embodiment, a search engine is provided and is configured to search for any topic. The system provides a user with the ability to add content to the results of their searches so that subsequent searches by that user and/or other users show that content in the search results. Non-limiting examples of content that can be added include images, videos, articles, and/or polls.

Figure 15:
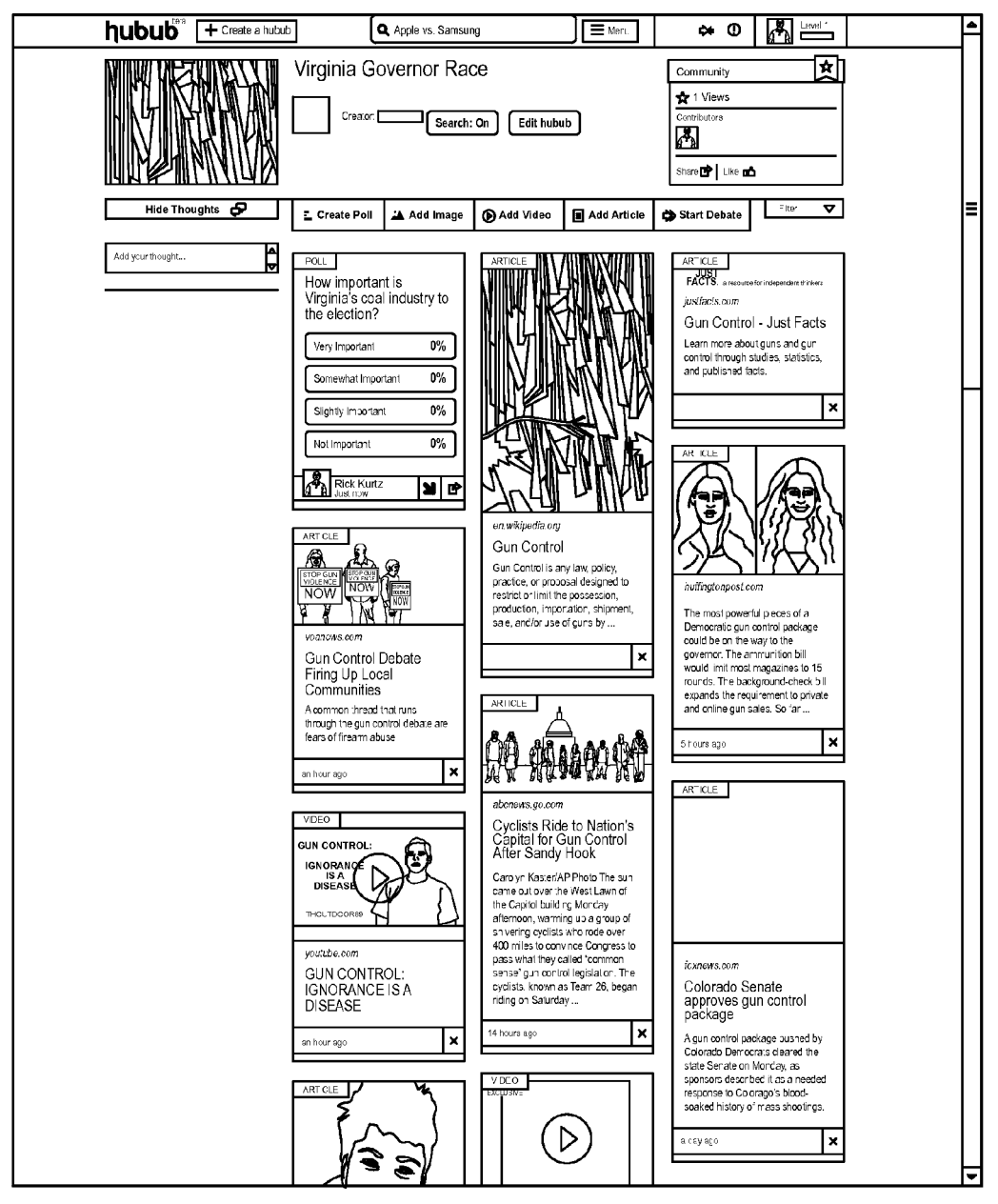

FIG. 15 illustrates a home page in accordance with the social-search embodiment. A search bar is provided on the page, e.g., at the top of the page. A user can enter search terms into the search bar and, as the user types the search terms, the system can display a drop-down list of topics that changes in real time or near real time as search terms are entered. In the example shown in FIG. 15, the search terms are "Apple vs Samsung." The system is configured to display images beside existing topics, i.e., topics for which a topic page has already been created by any user or topics which have already been searched by any user. The user conducting the search can select an existing topic from the drop down list or, alternatively, create a new topic by hitting "enter" or selecting the topic that has a placeholder "h" image beside it.

Figure 16:
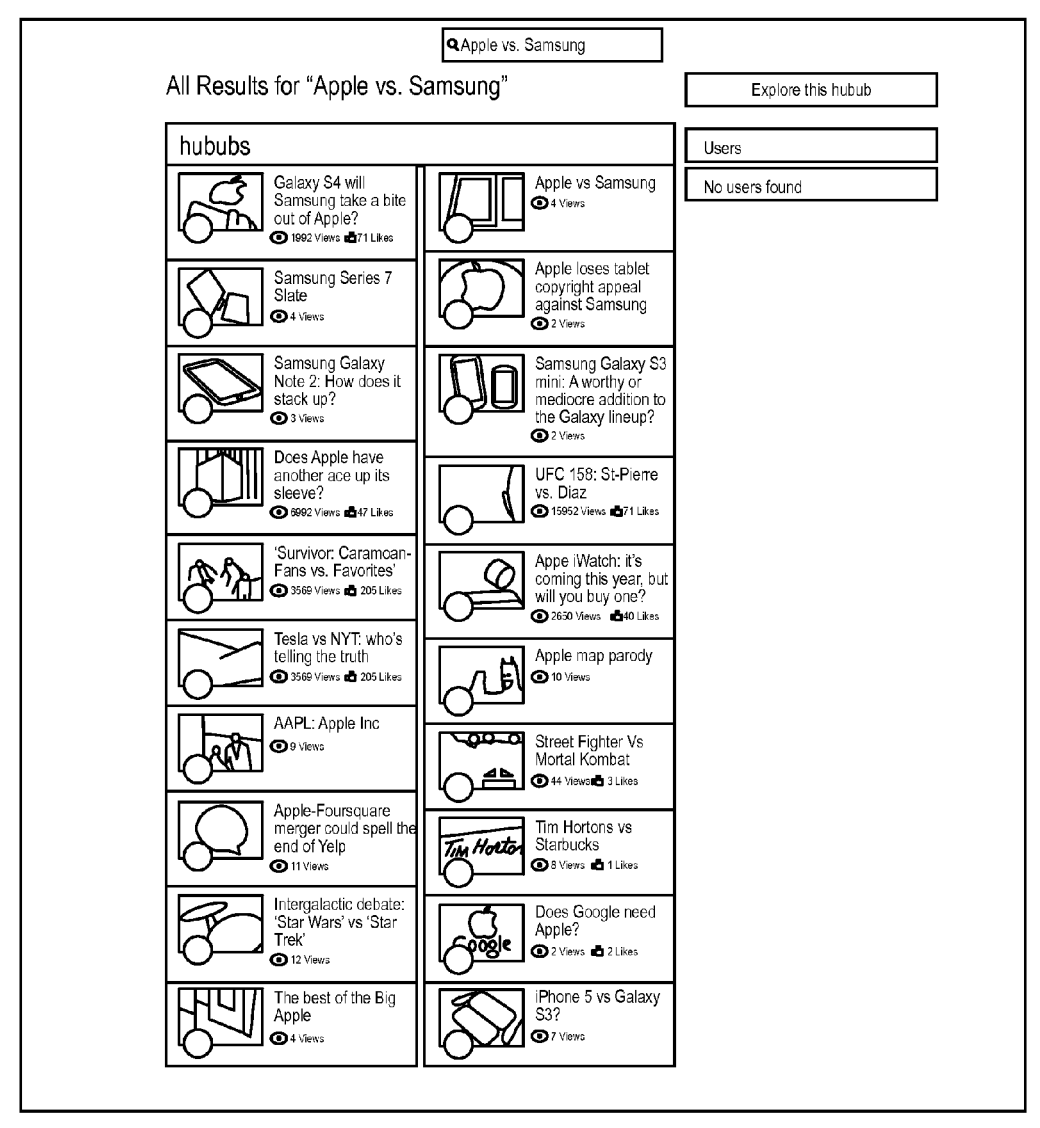

FIG. 16 shows an initial results page for the "Apple vs. Samsung" search. This screen displays a set of thumbnails representing articles and other content that the search engine identified as pertaining to the search entered by the user. The interface of FIG. 16 allows a user to select a one or more thumbnails upon which the final search results page will be based. In displaying the search results, the system may provide higher priority to displaying articles that have been commercially sponsored. For example, a pest control company may provide funds or other form of consideration in exchange for bringing articles containing expert advice written by their staff up to the top of the search results page when a user enters the search term "termites." In this respect, the system may be configured to receive an article uploaded by a commercial user which has paid consideration and to automatically match such uploaded articles to topics and/or search terms that are relevant so that the article can be floated to the top of the search results page and/or can appear on topic pages that are relevant. In this manner, the system can provide highly targeted advertising in a manner that is desirable to the target customer.

Figure 16A:
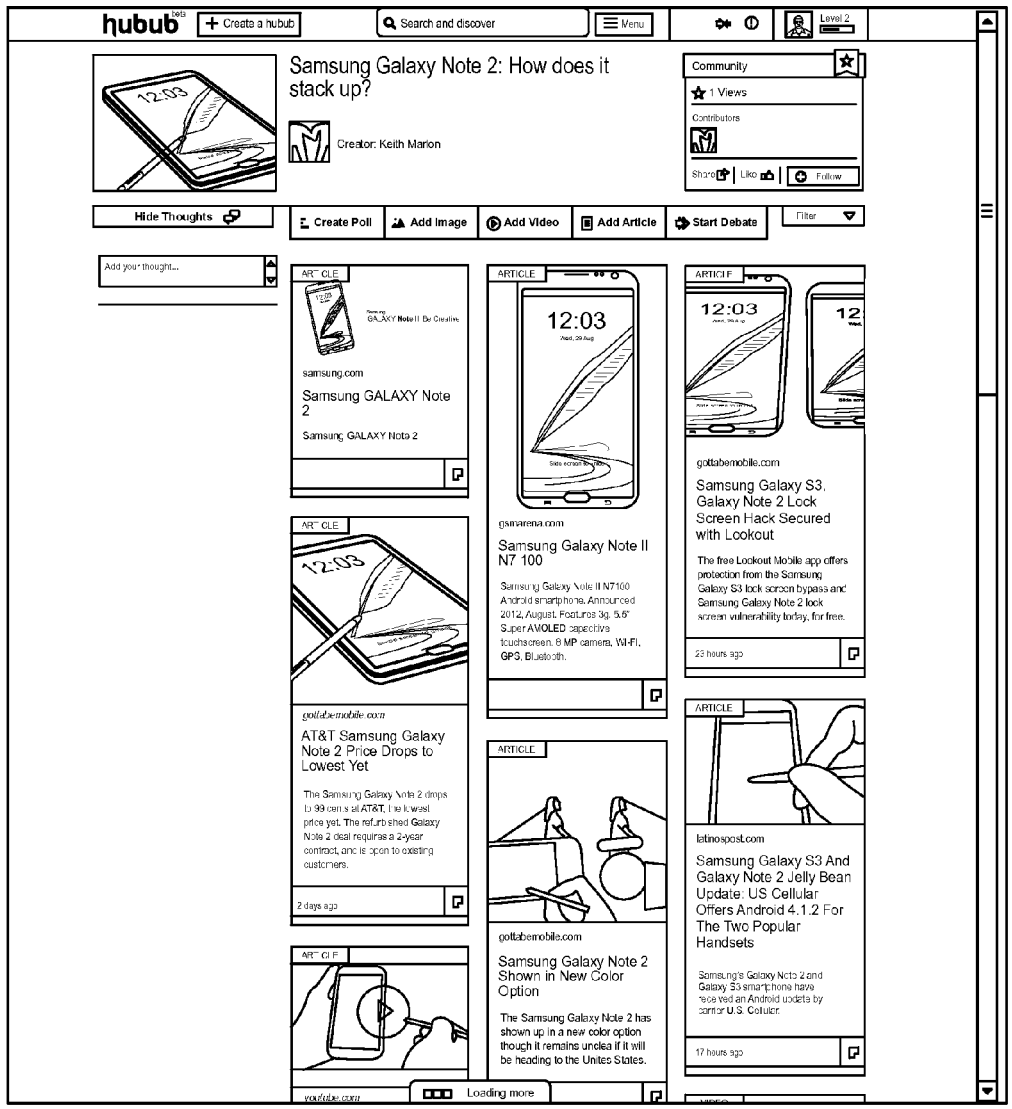
FIG. 16A shows a results page after a thumbnail has been selected from FIG. 16.

FIG. 16A shows a final search results page that is displayed after the user selects a thumbnail in the screen of FIG. 16. The format of the search results page may be similar to the format of the topic pages discussed above with reference to FIGS. 12A and 12B, and the functionality associated therewith may be provided. An "Explore this hubub" push-button control may be provided to allows the user to create a topic from the search results page, in much the same manner as is described above with reference to FIGS. 2-12. The search engine of the present invention can be configured to further limit the search results to content within the present system. The engine may also be configured to display to the user on the initial or final search results page, or the published topic page, prospective deals that the user may be interested in based upon the search terms, topic name and category selected by the user. For example, if the user enters the term "termites" in the search bar or during the process of creating a new hubub, the system may display on the search results page a local deal by which the user can receive a pest treatment for a discounted rate. In this manner, the commercial user is provided with the ability to present deals to a user who is already interested in a topic that is relevant to their product or service.

As shown in FIG. 16A, the user is provided with an interface on the search results screen which allows him or her to add an image to the search results, add a video to the search results, add an article to the search results, and add a poll to the search results. Other forms of content may also be added to the search results. In this respect, the system can be configured such that, after such content is added to the search results, subsequent searches for the term or terms entered by the user will result in the building of a page that includes the content added by the user. A process for adding an image to the search results is described below, and the process may operate in a similar manner with respect to the addition of videos, articles, and any other content to the search results. Videos, articles, and other content may be added simply by pasting a URL in the text box shown next to the "Choose" button shown in FIG. 16. Alternatively, a browser plugin may be provided to allow a user to add content from any page on the internet via a button that is displayed on the user's browser regardless of the site that is being visited. The function that allows a user to add a poll to the search results operates in much the same manner as is discussed above with reference to FIGS. 13 and 14.

Figure 17:
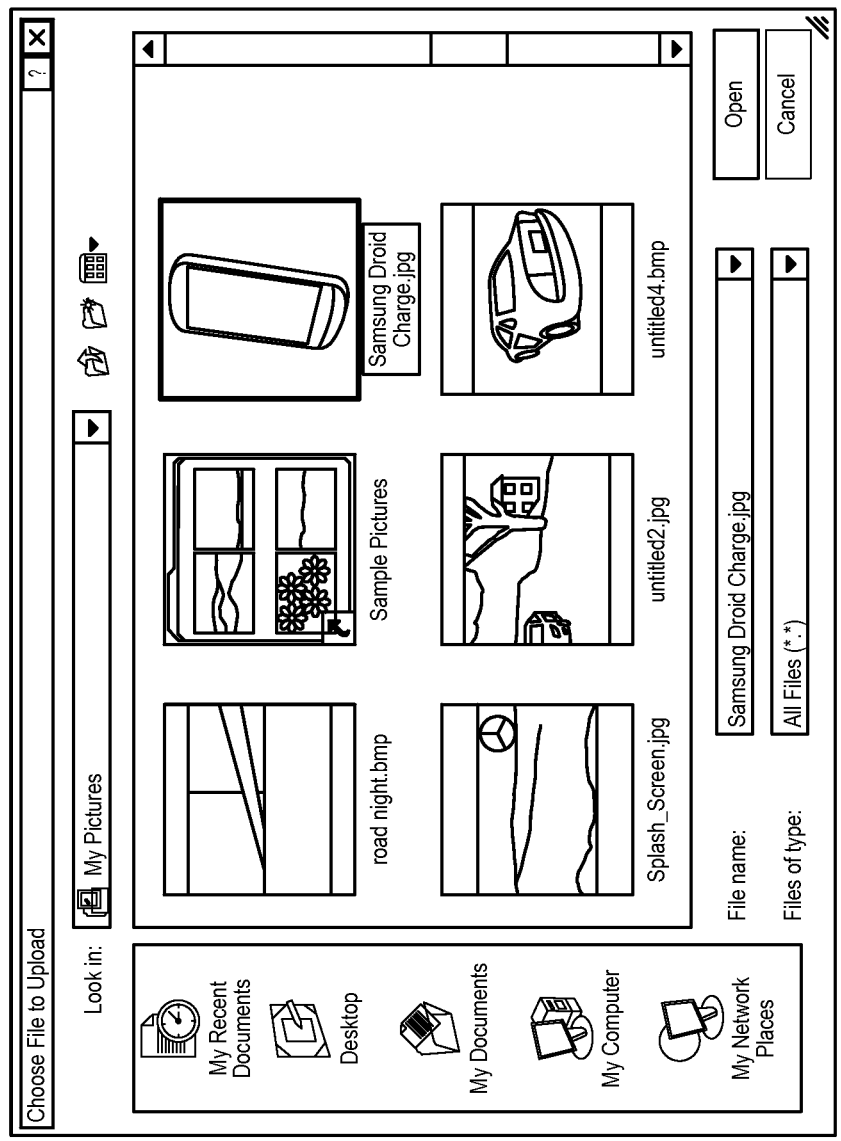
FIG. 17 shows an example of a dialog box that allows a user to add content to search results.

FIG. 17 shows an example of a dialog box that is displayed when a user selects the "Choose" button under the "Add Image" tab in FIG. 16. The dialog box allows the user to select a local graphics file for uploading to the system of the invention.

Figure 18:
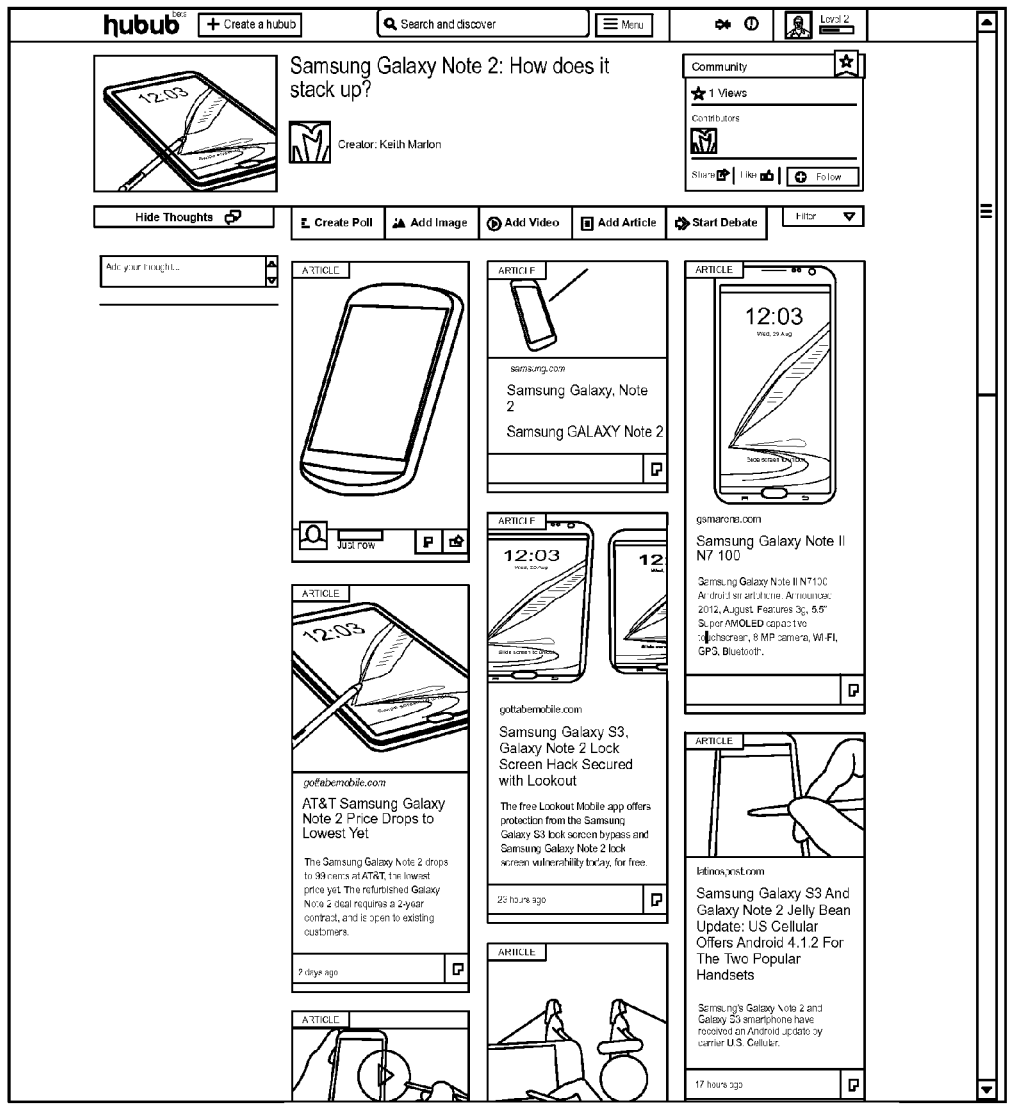
FIG. 18 shows an example of a search results page after the user has added content.

FIG. 18 shows an example of a search results page after the user has uploaded an image in accordance with the procedure described above. The uploaded image is displayed in the search results. The system is configured such that future searches for the terms "Apple vs Samsung" or related terms, by the user or any other user, will include the image uploaded by the user. The system handles other content, such as videos, articles, and polls, that were added by the user in a similar manner, displaying them in the search results page. Thus, the social-search embodiment provides a very powerful means for users to contribute content to search results that they think best fits, thereby leveraging a network of human brains in making a determination that particular content should be included in search results for a particular set of terms and/or related terms. By providing a social search function that allows humans who have an affinity for a topic to correlate the semantics between content and a topic of search, the invention can provide a dynamic system that improves search results over time.

Figure 19:
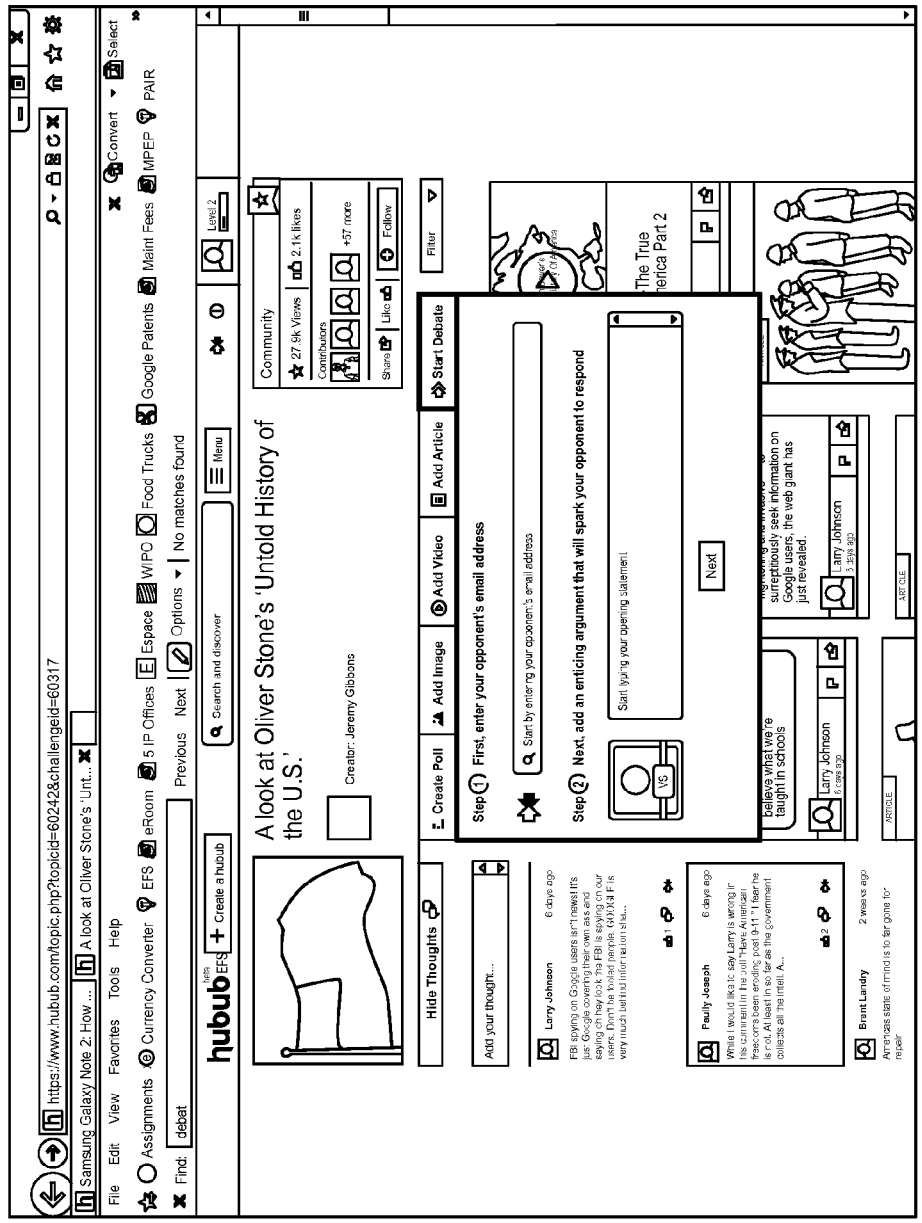
Figure 20:
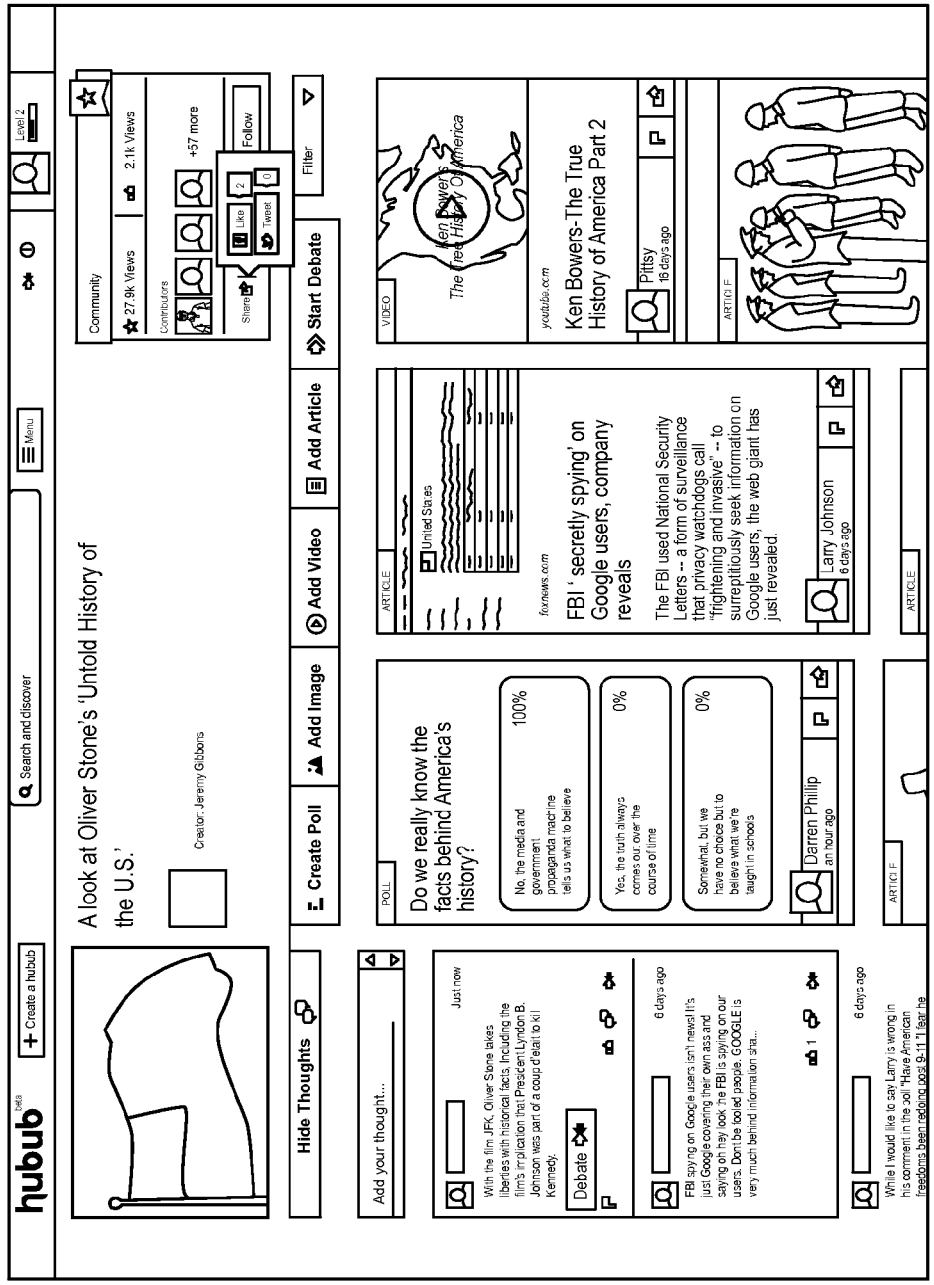
Figure 21:
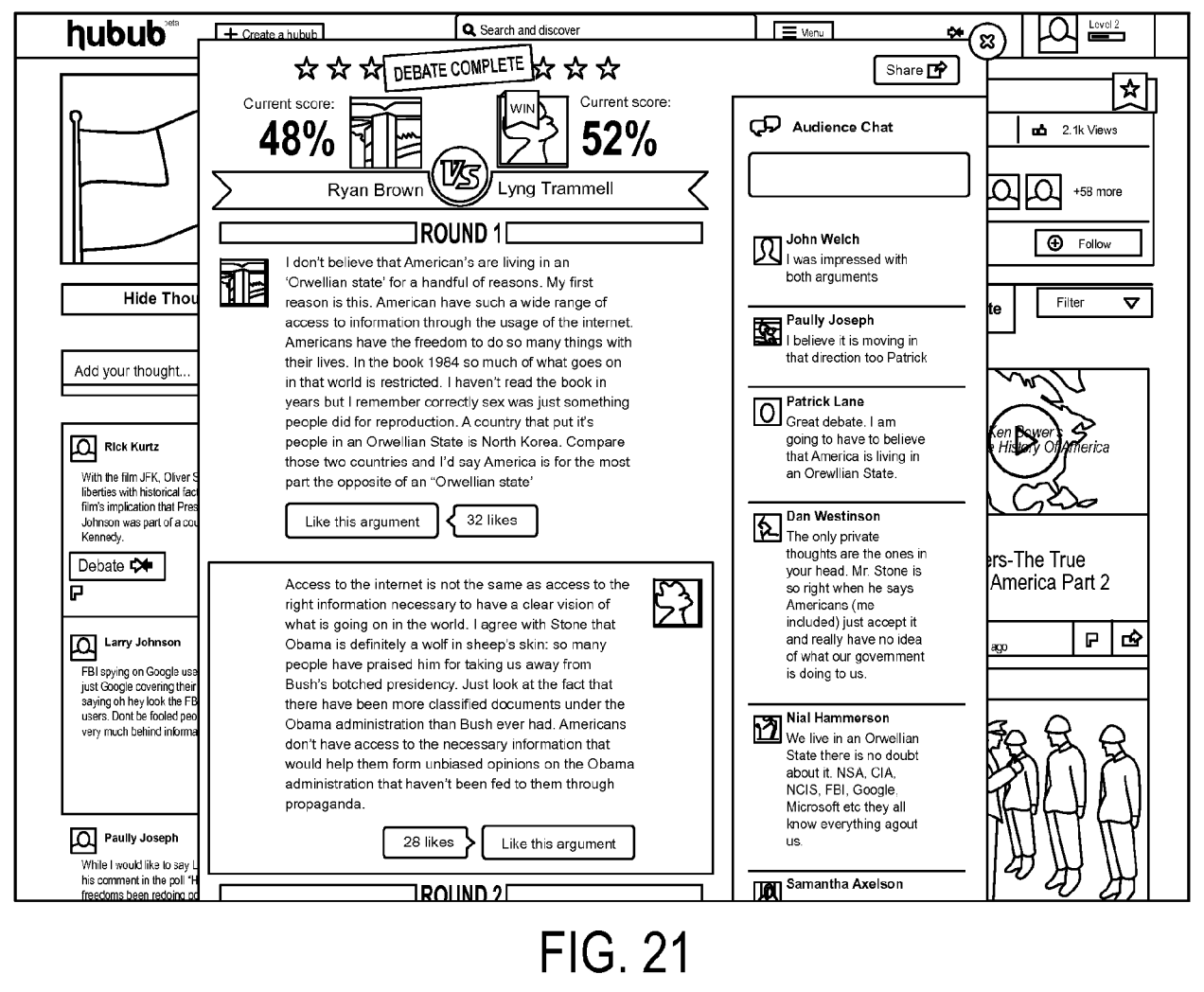

As shown at the top of FIG. 18, for example, published topic pages and other pages in the system can be provided with a "Start Debate' pushbutton control. FIGS. 19-21 illustrate the process that is initiated by activation of the Start Debate control. Such pushbutton control may also be displayed in association with a particular comment within a comment stream such as that shown in the lefthand column of FIG. 21. As shown in FIG. 19, a dialog box is displayed requesting input from the initiating user as to the identification (e.g., email address or user name) of the opposing user that the initiating user wishes to challenge to a debate. This dialog box also includes a field for entering an enticing argument that will spark the opponent to respond. Clicking the "Next" button causes a notification to be sent to the proposed opponent via email, text, a notification within an app, or other notification means, advising the opponent that he has been challenged to a debate. Such notification may also include the text of the argument of that was entered by the initiating user, along with a link to the debate and/or an "accept" link. The opponent can then proceed to post an opposing comment. As is shown in FIG. 20, the comments of the initiator and those of any opponent accepting the challenge are shown in the left-hand column of a topic page or other page. Below each comment, the system provides the ability for users to give each comment an up or down vote. The system can be configured to tally the up and down votes at a predetermined interval, e.g., 24 hours after the challenge was accepted, to determine and display the winner of the debate. FIG. 21 shows an example of a screen notifying users of the winner of a debate. The winner of the debate may also be awarded points in accordance with the point system discussed above.

The system can be configured to allow a team of users to use the system to create a new work such as a school project. In this respect, the system can be configured to allow team members to collaborate and build a topic page, essay, article or blog around a topic. With respect to essays, articles and blogs, the system may be configured to operate through a third-party API to provide the ability to create a particularly formatted article or other end product. Of course, the system may also be configured to call its own API to allow users to author a particularly formatted article or other content.

In accordance with an embodiment of the disclosed invention, any data generated as a result of user interaction with the system may be mined and sold for market research purposes. For example, the hash tags that users have associated with topics may be used to gain insight into the types particular information sources that a user with an affinity for that topic prefers.

Technologies used to implement the invention may include, for example, the following:
OSS
  Apache—http://httpd.apache.org/
    The core web server platform
  PHP—http://www.php.net
    The core development platform
  Mysql—http://www.mysql.com/
    Main database infrastructure
  twitter php—www.twitter.com
    Back end twitter communications (auth)
  facebook php—www.facebook.com
    Back end facebook communications (auth)
  UserInfUser—http://code.google.com/p/userinfuser/ &&
    www.cloudcaptive.com
    Gamification API
  Google search—www.google.com
    Search services and dynamic content
  Bing search
    Search services and dynamic content
  twitter js—www.twitter.com
    Client side twitter communications (search)
  facebook js—www.facebook.com
    Client side facebook communications (search)
  jquery—http://jquery.com/
    Main client development platform
  knockout js—http://knockoutjs.com/
    Client side UI data binding
  masonry—http://masonry.desandro.com/
    Mosaic dynamic layout
  swipejs—http://swipejs.com/
    Swipe actions for all touch based browsers
  excanvas—http://excanvas.sourceforge.net/
    HTML5 canvas for internet explorer
  google analytics—analytics.google.com
    core analytics
  ajaxmanager—http://www.protofunc.com/scripts/jquery/ajaxManager/
    web service call distributor and debouncer
  jqplot—http://www.jqplot.com/
    html5 graphing/charting
  google webfont—https://fonts.googleapis.com
    improved fonts for web pages
  phpboing—http://code.google.com/p/phpboing/
    IOC container for push server
  php-annotations—http://code.google.com/p/php-annotations/
    Annotation processing for the IOC container
  log4php—http://logging.apache.org/log4php/
    flexible scalable logging
  socketdaemon—http://code.google.com/p/phpsocketdaemon/
    high performance socket framework for php
Commercial
  AWS—Amazon web services—all production infrastructure including web servers, databases, caches and load balancers
  Cloudflare—scalable dns service
  Edgecast—Content delivery network
  Web Purify—profanity removal
  addthis—share support for social media The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A computer-implemented automated method for operating a system that populates web pages with content along with a user interface for interactive discussion of an end-user-specified topic, comprising a non-transitory computer-readable medium with program code for:
   receiving across a network a topic from an end user;
   receiving across the network one or more search terms from the user that pertain to the topic;
   conducting a search based at least upon the topic and the search terms pertaining to the topic;
   transmitting to the user across the network a search results page displaying thumbnails representing content items regarding the topic and the search terms, said page displaying thumbnails including an interface to select which of the items should appear on a published topic page;
   building, based at least in part on said user's selection of content items from search results, one or more web-accessible topic pages having dynamic content that is relevant to the topic along with interactive means for provoking participation of multiple users regarding the topic and the content;
   transmitting said one or more web-accessible topic pages across the network to the user's computer for display;
   wherein said steps of receiving a topic, receiving one or more search terms, conducting a search, transmitting a search results page, and building one or more web-accessible pages are performed by a particular machine, said particular machine comprising one or more computing devices.

2. The computer-implemented automated method for populating web pages according to claim 1, wherein the step of displaying thumbnails representing content items further comprises updating displayed content items related to said one or more search terms in real time or near real time as the user types search terms, such that the user can formulate and reformulate search terms that will result in content that is relevant to the topic being displayed dynamically over time in said web-accessible topic page.

3. The computer-implemented automated method for populating web pages according to claim 1, wherein said search terms are used by said search engine to refine said search.

4. The computer-implemented automated method for populating web pages according to claim 1, further comprising the steps of:
   displaying to the user a series of hash tags associated with the selected items;
   providing the user with an interface to select among the hash tags; and, using selected hash tags in said search step.

5. The computer-implemented automated method for populating web pages according to claim 1, wherein said interactive means for provoking participation comprises a comment feature whereby users can post comments relating to the topic and the content to a comment stream that is displayed on the topic page.

6. The computer-implemented automated method for populating web pages according to claim 1, wherein said interactive means for provoking participation comprises a debate feature whereby a user can challenge another user to a debate, the winner of which is automatically determined by the system.

7. The computer-implemented automated method for populating web pages according to claim 6, wherein said winner of the debate is automatically determined by the system based at least in part upon the number of up and down votes received from a community.

8. The computer-implemented automated method for populating web pages according to claim 1, wherein said step of transmitting a page displaying thumbnails representing content items comprises providing a higher priority to displaying articles that have been commercially sponsored.

9. The computer-implemented automated method for populating web pages according to claim 1, wherein said content items comprise content from content sources across an internet.

10. The computer-implemented automated method for populating web pages according to claim 1, wherein said search results page comprises an interface which allows the user to add an image or video to the search results such that subsequent searches for said one or more search terms will result in the building of a page that includes the image or video added by the user.

11. The computer-implemented automated method for populating web pages according to claim 1, wherein said search results page comprises an interface which allows the user to add an article to the search results such that subsequent searches for said one or more search terms will result in the building of a page that includes the article added by the user.

12. The computer-implemented automated method for populating web pages according to claim 1, wherein said step of building one or more web-accessible topic pages comprises providing a higher priority to displaying articles that have been commercially sponsored.

* * * * *